United States Patent [19]

Jäckel et al.

[11] Patent Number: 5,649,348
[45] Date of Patent: Jul. 22, 1997

[54] METHOD OF ASSEMBLING AND MOUNTING A TORQUE TRANSMITTING APPARATUS

[75] Inventors: Johann Jäckel, Baden-Baden; Hartmut Mende, Sinzheim, both of Germany

[73] Assignee: LuK Lamellen und Kupplungsbau GmbH, Buhl, Germany

[21] Appl. No.: 486,509

[22] Filed: Jun. 7, 1995

Related U.S. Application Data

[62] Division of Ser. No. 188,231, Jan. 28, 1994, Pat. No. 5,459,916.

[30] Foreign Application Priority Data

Jan. 30, 1993 [DE] Germany .................. 43 02 649.4

[51] Int. Cl.[6] .................................................. B23Q 17/00
[52] U.S. Cl. ........................... 29/407.08; 29/434; 29/446; 29/469; 29/510; 29/525
[58] Field of Search .................. 29/407.08, 407.05, 29/407.01, 434, 446, 469, 510, 515, 525

[56] References Cited

U.S. PATENT DOCUMENTS

| | | | |
|---|---|---|---|
| 4,811,474 | 3/1989 | Maucher et al. | 29/446 |
| 4,989,710 | 2/1991 | Reik et al. | 192/70.17 |
| 5,042,632 | 8/1991 | Jackel | 192/55.1 |
| 5,135,092 | 8/1992 | Jackel | 192/213.22 |
| 5,160,007 | 11/1992 | Reik et al. | 192/70.17 |
| 5,161,295 | 11/1992 | Westendorf et al. | 29/434 |
| 5,161,660 | 11/1992 | Huber | 192/213.1 |

*Primary Examiner*—David P. Bryant
*Attorney, Agent, or Firm*—Darby & Darby

[57] ABSTRACT

A multiple-component torque transmitting apparatus for attachment to the crankshaft of an engine is assembled by: (a) moving the pressure plate of an assembled friction clutch by a force applying device axially in a first direction toward a clutch housing and against the bias of a clutch spring with a force exceeding the operating point of the clutch spring, (b) measuring the magnitude of the force and the distance which is covered by the pressure plate and/or one or more portions of the spring and generating corresponding signals, (c) jointly moving the housing and the pressure plate axially in a second direction counter to the first direction and with a force exceeding the operating point and generating corresponding signals, (d) relaxing the force upon the clutch, (e) processing the signals into a further signal denoting the desired or optimum operating point of the clutch spring, (f) moving the clutch and a flywheel against each other until the bias of the spring reaches the calculated operating point, and (g) fixing the housing to the flywheel.

19 Claims, 8 Drawing Sheets

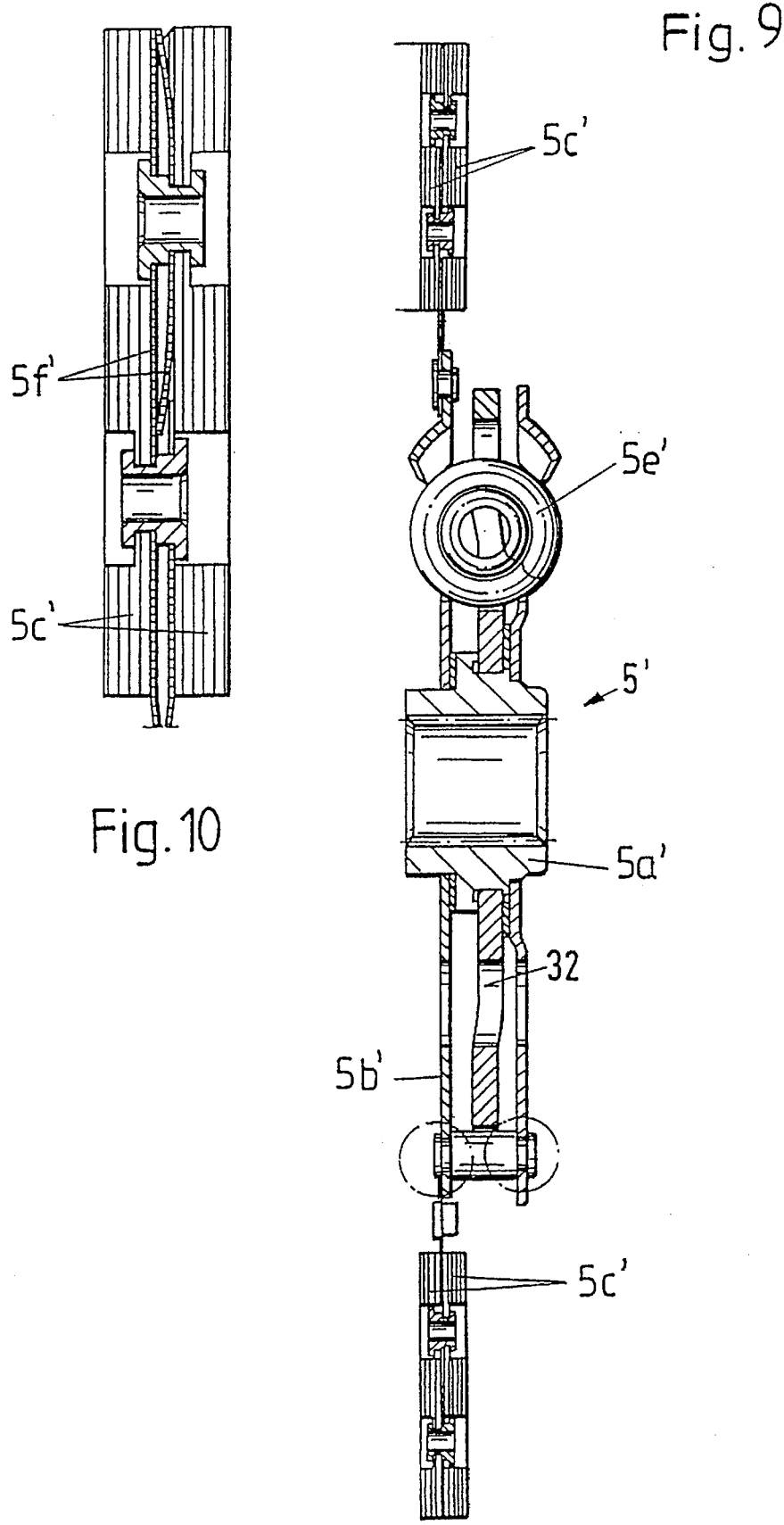

//<br>
METHOD OF ASSEMBLING AND MOUNTING A TORQUE TRANSMITTING APPARATUS

CROSS REFERENCE TO RELATED CASE

This is a division of the commonly owned patent application Ser. No. 08/188,231 filed Jan. 28, 1994, now U.S. Pat. No. 5,459,916 granted Oct. 24, 1995.

BACKGROUND OF THE INVENTION

The present invention relates to improvements in methods of assembling torque transmitting apparatus, and more particularly to improvements in methods of assembling torque transmitting apparatus which embody friction clutches. Apparatus of such character can be utilized to transmit torque between the output element of an engine and a power train which drives the front and/or the rear wheel or wheels of an automobile or another motor vehicle. Still more particularly, the invention relates to improvements in methods of assembling torque transmitting apparatus of the type wherein the friction clutch includes or constitutes a module having a pressure plate which is axially movably but non-rotatably coupled to a clutch cover or clutch housing and is biased by a clutch spring to engage and urge the friction linings of a clutch disc against a counterpressure plate in the engaged condition of the clutch.

OBJECTS OF THE INVENTION

An object of the present invention is to provide a method of assembling, and mounting on a rotary output element, a torque transmitting apparatus in such a way that one can accurately select and arrive at optimal operational parameters, such as for example the bias of the clutch spring, independently of machining and/or mounting tolerances of individual constituents of the apparatus.

Another object of the invention is to provide a method which renders it possible to select certain operational data, such as the bias of the clutch spring, with a heretofore unmatched degree of accuracy and to thus ensure that a clutch spring (e.g., a clutch spring which constitutes a membrane or a diaphragm spring) can be installed to assume optimum positions in engaged and disengaged conditions of the friction clutch.

A further object of the invention is to provide a method which renders it possible to achieve the permissible tolerances for assembly of the constituents of the friction clutch itself, as well as of a module which includes the friction clutch, and the means for attaching the friction clutch to the output element of an engine or another prime mover.

An additional object of the invention is to provide a method which eliminates or excludes the influence of friction and/or certain other undesirable phenomena upon the results of measurements which are being carried out in the practice of the method.

Still another object of the invention is to provide a method which renders it possible to achieve accurate centering of the housing or cover of the friction clutch relative to the output element of a prime mover, particularly relative to a flywheel which receives torque from the output element.

A further object of the invention is to provide a method which renders it possible to assemble a high-quality torque transmitting apparatus that is ideally suited to transmit torque between the engine and one or more wheels of a motor vehicle.

Another object of the invention is to provide a method which renders it possible to assemble and to install a torque transmitting apparatus with a high degree of reliability and to enhance the safety factor of such apparatus.

An additional object of the invention is to provide a simple and inexpensive method of assembling a torque transmitting apparatus which can be put to use in motor vehicles or elsewhere and whose useful life is longer than that of torque transmitting apparatus which are assembled in accordance with heretofore known methods.

Still another object of the invention is to provide a method which renders it possible to accurately select the optimum dimensions of the torque transmitting apparatus in the direction, as well as radially, of the rotational axis of its constituents.

An ancillary object of the invention is to provide a torque transmitting apparatus which is assembled in accordance with the above-outlined method.

Another ancillary object of the invention is to provide a motor vehicle embodying a torque transmitting apparatus which is assembled in accordance with the above-outlined method.

A further object of the invention is to provide a module which is assembled in accordance with the above-outlined method and comprises at least some components or constituents of a friction clutch.

Another object of the invention is to provide a module which is assembled in accordance with the above-outlined method and embodies a friction clutch as well as the components which are to secure the friction clutch to the output element of a prime mover.

An additional object of the invention is to provide a method of assembling a torque transmitting apparatus which carries, and adequately confines in optimum positions, those parts which are necessary to affix the apparatus to, and to center the apparatus on, a rotary output element such as the crankshaft of an internal combustion engine in a motor vehicle.

A further object of the invention is to provide a method of assembling a torque transmitting apparatus which is ideally suited for shipment to storage or to an assembly plant for motor vehicles or the like.

SUMMARY OF THE INVENTION

One feature of the present invention resides in the provision of a method of assembling a multiple-component torque transmitting apparatus wherein a first component (comprising an engageable and disengageable friction clutch) includes a module containing a pressure plate that is rotatable about a predetermined axis together with a clutch housing and is movable relative to the housing in the direction of the axis, and a clutch spring that reacts against the housing and bears against the pressure plate axially and away from the housing with a first force which reaches an operating point in the engaged condition of the clutch. The method comprises the steps of: (a) moving the pressure plate by a force applying device axially in a first direction toward the housing and against the bias of the clutch spring with a second force exceeding the operating point, (b) measuring and memorizing the magnitude of the second force and the distance which is covered by the pressure plate during movement toward the housing, (c) generating first and second signals which respectively denote the measured second force and the measured distance, (d) jointly moving the housing and the pressure plate axially of the pressure plate by a force applying device in a second direction counter to the first direction and with a third force exceeding the operating point, (e) measuring and memorizing the magnitude of the third force and the distance covered during joint movement of the pressure plate and the housing in the second direction, (f) generating third and fourth signals which respectively denote the measured third force and the distance covered during joint movement of the housing and the pressure plate, (g) disengaging the force applying device from the module, (h) processing the first, second, third and fourth signals into a fifth signal denoting a desired operating point, (i) moving the module and at least one additional component of the apparatus axially of the pressure plate against each other with attendant stressing of the clutch spring until the bias of the spring reaches the desired operating point, and (j) fixing the housing to the at least one additional component.

The at least one additional component can include or constitute a flywheel which can be driven by a crankshaft or by an analogous output element of an engine, such as the engine of a motor vehicle. Alternatively, the at least one additional component can include or constitute a clutch disc.

The method can further comprise the step of holding the housing against movement, at least in the direction of the predetermined axis, in the course of the step of moving the pressure plate toward the housing.

The method can also comprise the step of terminating the application of force to the module upon completion of the measuring steps and/or the step of terminating the application of force to the pressure plate upon completion of the measuring steps.

The processing step is preferably carried out by a computer.

The clutch spring can include or constitute a diaphragm spring having a predetermined characteristic curve, and the measuring steps can include measuring the first and/or third force and at least one of the distances beyond a minimum of the characteristic curve.

If the friction clutch is designed in such a way that a radially outer portion of the clutch spring is movable into abutment with the housing, at least one of the measuring steps can be carried out while the radially outer portion of the clutch spring abuts the housing.

If the clutch spring comprises substantially radially extending prongs, the method can further comprise the steps of ascertaining the positions of the prongs and generating additional signals which denote the positions of the prongs. The processing step then preferably comprises processing the additional signals with the first, second, third and fourth signals.

The apparatus which is assembled in accordance with the improved method is subject to a minimum of wear, and the method can further comprise the step of generating a further signal denoting the minimum wear. The processing step then includes processing the further signal together with the first, second, third and fourth signals.

If the apparatus comprises the aforementioned first component and the aforementioned at least one additional component as well as a plurality of further components which are not considered in the course of the processing step, the method can further comprise the step of classifying the further components into a plurality of tolerance categories.

If the at least one additional component is a clutch disc or plate with friction linings, such clutch disc is located in the path of joint movement of the pressure plate and the housing in the second direction. This clutch disc can include a rotary carrier having a hub coaxial with the pressure plate, and the friction linings are located adjacent the carrier. Such a clutch disc can further comprise resilient means interposed between the carrier and the friction linings.

The method can also comprise the step of attaching the module to an output element of an engine upon completion of the fixing step.

The at least one additional component can include or constitute a secondary flywheel of a composite flywheel which further has a primary flywheel. The method can further comprise the step of attaching the primary flywheel to an output element of an engine upon completion of the fixing step.

Alternatively, the at least one additional component can include or constitute a flywheel, and the method can further comprise the step of providing at least one abutment for the flywheel upon completion of the measuring step. The step of providing at least one abutment can comprise deforming at least one portion of the housing toward the predetermined axis.

If the at least one additional component includes or constitutes a secondary flywheel or a single flywheel, the method can further comprise the step of centering the housing and the flywheel relative to each other so that one of the parts, including the housing and the flywheel, is a press fit in the other of these parts.

If the at least one additional component includes or constitutes a single flywheel or a secondary flywheel of a composite flywheel, the fixing step can comprise at least indirectly bonding (e.g., welding) the flywheel to the module.

The fixing step can include establishing a form-locking connection between the housing and the at least one additional component.

Another feature of the present invention resides in the provision of a method of mounting an engageable and disengageable friction clutch which—in the fully assembled condition—includes a complete module which comprises a flywheel and is connectable to a rotary crankshaft. The method comprises the stelas of: (a) assembling an incomplete module wherein a pressure plate is rotatable about a predetermined axis and is non-rotatably, but axially, movably connected with a housing and wherein a clutch spring reacts against the housing and directly or indirectly bears against the pressure plate in the engaged condition of the clutch; (b) fixing the incomplete module to the flywheel, including inserting a clutch disc between the pressure plate and the flywheel; (c) centering a cylindrical portion of the housing relative to a cylindrical guide of the flywheel and/or vice versa; (d) moving the housing and the flywheel toward each other in the direction of the predetermined axis with attendant stressing of the clutch spring beyond a predetermined operating point; (e) measuring the bias of the clutch spring; (f) moving the housing and the flywheel away from each other in the direction of the predetermined axis until the bias of the clutch spring decreases to the operating point; (g) measuring the bias of the clutch spring during movement of the housing and the flywheel away from each other; and (h) at least indirectly attaching the housing to the flywheel in a predetermined angular and axial position.

The step of assembling an incomplete module can comprise providing a device for disengaging the friction clutch.

The operating point of the clutch spring can be established by a set value. The operating point can be a function of the characteristic of the clutch spring. An operative position can be established by averaging the measurements against the bias of the clutch spring and counter to the aforementioned direction.

The method can further comprise the step of establishing a predetermined friction between the cylindrical portion of the housing or flywheel and the cylindrical guide of the flywheel or housing.

The novel features which are considered as characteristic of the invention are set forth in particular in the appended claims. The improved method itself, however, together with additional features and advantages thereof, will be best understood upon perusal of the following detailed description of certain presently preferred specific embodiments with reference to the accompanying drawings.

BRIEF DESCRIPTION OF THE DRAWINGS

FIG. 9 is an axial sectional view of a clutch disc or clutch plate which can be utilized in the torque transmitting apparatus of FIGS. 1–4, FIG. 5, FIG. 6, FIG. 7 or FIG. 8 in lieu of the clutch discs actually shown in FIGS. 1, 5, 6, 7 and 8; and FIG. 10 is an enlarged view of a portion of the clutch plate or clutch disc which is shown in FIG. 9.

DESCRIPTION OF PREFERRED EMBODIMENTS

Figure 1:
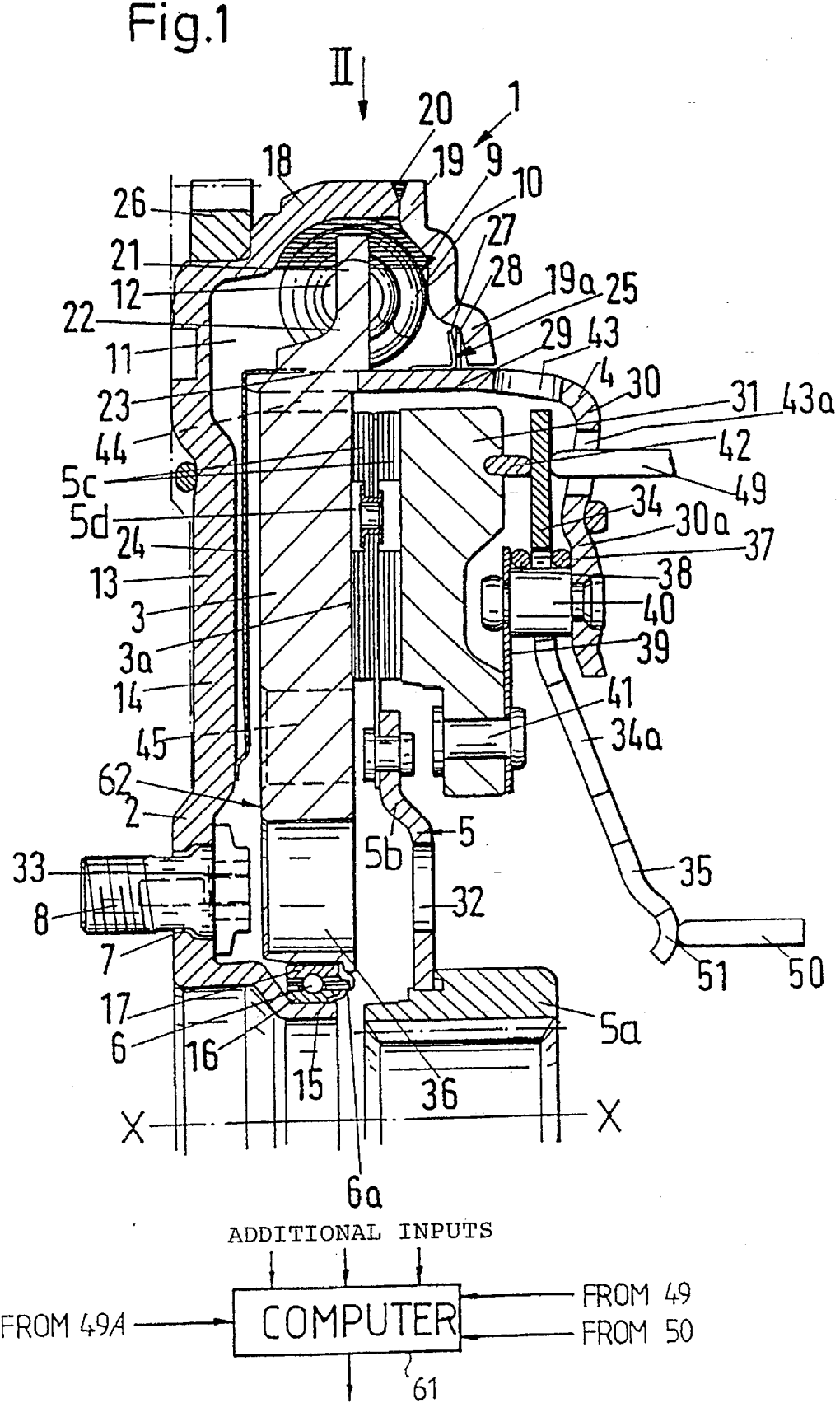
FIG. 1 is a fragmentary axial sectional view of a torque transmitting apparatus which is assembled in accordance with a first embodiment of the improved method and wherein the housing of the friction clutch receives torque from the secondary flywheel of a composite flywheel.

Referring first to FIG. 1, there is shown a portion of a torque transmitting apparatus which is assembled and which can be connected to a rotary output element (e.g., a crankshaft) of a prime mover (such as an internal combustion engine in a motor vehicle) in accordance with the method of the present invention. The apparatus comprises a composite flywheel 1 having a first or primary flywheel 2 which is connectable (directly or indirectly) to the output element of the engine, and a second or secondary flywheel 3 which is affixed to a housing or cover 30 of a friction clutch 4. The latter comprises a clutch plate or clutch disc 5 which is installed between the secondary flywheel 3 and an axially movable pressure plate 31 of the friction clutch 4. The hub 5a of the clutch disc 5 can be non-rotatably mounted on the rotary input element of a variable-speed transmission (not shown) which can form part of a power train between the secondary flywheel 3 and the front and/or rear wheel or wheels of a motor vehicle. The illustrated clutch disc 5 constitutes but one of a number of clutch discs which can be utilized in the friction clutch 4 to transmit torque from an engine to a transmission. A modified friction clutch 5' is shown in FIGS. 9 and 10. The modified friction clutch 5' comprises a disc-shaped carrier 5b' for resilient elements 5 interposed between the carrier 5b' and friction linings 5c'. The clutch disc 5 of FIG. 1 comprises the carrier 5b but the friction linings 5c are riveted (at 5d) directly to the carrier 5b, i.e., the resilient elements 5f of the clutch disc 5' of FIGS. 9 and 10 are omitted from the clutch disc 5 of FIG. 1. The damper 5e' of the clutch disc 5' is also omitted from clutch disc 5. The clutch disc 5' of FIG. 9 is similar to that described and shown in published German patent application Serial No. P 42 06 880. Alternatively, the clutch disc can be of the type disclosed in commonly owned U.S. Pat. No. 5,161,660 granted Nov. 10, 1992 to Lothar Huber for "CLUTCH PLATE WITH PLURAL DAMPERS." Such dampers are interposed between the hub and the friction linings of the patented clutch disc. Still further, the rivets 5d (of which only one is shown in FIG. 1) which connect the carrier 5b to the friction linings 5c can constitute suitably deformed portions of the carrier 5b.

The friction clutch 4 of FIG. 1 further comprises an antifriction bearing 6 which is interposed between the flywheels 2 and 3, and such bearing is installed radially inwardly of a set of holes or bores 7 provided in the primary flywheel 2 for the shanks of threaded fasteners 8 which serve to separably attach the primary flywheel 2 (and hence the entire torque transmitting apparatus) to the output element (e.g., a crankshaft, not shown) of an engine. The bearing 6 comprises at least one annulus of spherical or otherwise configurated rolling elements and is adjacent a cup-shaped sealing element 6a which defines an annular chamber for a supply of lubricant (e.g., grease) for the rolling elements of the bearing 6. The sealing element 6a preferably further forms part of or constitutes a thermal barrier which prevents, or at least reduces, the transfer of heat from the secondary flywheel 3 to the primary flywheel 2 of the composite flywheel 1.

The torque transmitting apparatus of FIG. 1 further comprises a damper 9 which is interposed between the flywheels 2, 3 and comprises an annulus of energy storing elements 10, preferably arcuate coil springs, installed in an annular compartment 12 constituting the radially outermost portion of an annular chamber 11. At least a portion of the chamber 11 (for example, its compartment 12) is filled with a suitable preferably highly viscous lubricant, e.g., oil or grease. The thermal barrier 6a performs the additional function of preventing overheating of lubricant in the chamber 11.

The primary flywheel 2 includes a main section 13 which is or which can be made of metallic sheet material, e.g., by stamping. The radially inner portion 14 of the main section 13 has an axially extending protuberance 15 which is surrounded by and has a shoulder for the inner race 16 of the antifriction bearing 6 and is disposed radially inwardly of the bores or holes 7. The outer race 17 of the bearing 6 is received in an axial recess of the secondary flywheel 3. When the flywheels 2, 3 of the composite flywheel 1 are properly coupled to each other and the friction clutch 4 is properly assembled with the secondary flywheel 3, the central portion 14 of the main section 13 of the flywheel 2 is ready to be affixed to the output element of an engine by means of the threaded fasteners 8 whose shanks are to be driven into tapped bores of the output element of the engine.

The radially inner portion 14 and/or the protuberance 15 can constitute a separately produced part which is welded or otherwise affixed to the main section 13 of the primary flywheel 2.

The radially outer portion 18 of the main section 13 of the primary flywheel 2 defines the major part of the chamber 11 and of its radially outermost portion or compartment 12. The secondary flywheel 3 resembles a substantially flat disc the central portion of which is provided with the aforementioned recess for the outer race 17 of the antifriction bearing 6 and for a portion of the thermal barrier 6a.

The radially outer portion 18 of the main section 13 of the primary flywheel 2 extends radially outwardly away from the axis X—X of the pressure plate 31 and thereupon, in parallelism with such axis, surrounds the radially outer portion of the compartment 12 and the energy storing elements 10 of the damper 9. The axially extending part of the portion 18 dan constitute an abutment for the energy storing elements 10 during rotation of the composite flywheel 1, i.e., while the energy storing elements 10 are urged radially outwardly by centrifugal force. The primary flywheel 2 further comprises a separately produced wall 19 which is welded (as at 20) or is otherwise sealingly secured to the adjacent end of the axially extending part of the portion 14. The wall 19 can be made of metallic sheet material and bounds the adjacent portion of the compartment 12 of the annular chamber 11. The illustrated wall 19 comprises several radially extending portions which are offset relative to each other in the direction of the axis X—X. It will be seen that the wall 19 bounds a relatively small, and the portion 14 of the main section 13 surrounds a much larger, portion of the annular chamber 11 and its compartment 12. The radially inner portion 19a of the wall 19 constitutes an annular guide which centers a cylindrical radially outer portion 29 of the clutch cover or housing 30. It can also be said that the cylindrical portion 29 of the housing 30 centers and guides the wall 19 and hence the primary flywheel 2. The radially inner portion 19a slopes radially inwardly toward the axis X—X and away from the main section 13, i.e., it is not disposed in a plane which is exactly normal to the axis X—X.

The portion 14 and the wall 19 of the primary flywheel 2 are provided with axially extending portions or pockets which subdivide the annular compartment 12 of the chamber 11 into a series of arcuate sections, one for each of the energy storing elements 10. Each energy storing element 10 abuts two adjacent pockets of the portion 14 and the adjacent two pockets of the wall 19 when the flywheels 2 and 3 assume their neutral positions in which the energy storing elements 10 are not stressed at all or are subjected to minimal stresses. The exact configuration of the portion 14 of the wall 19 can be similar or identical to that described and shown in commonly owned U.S. Pat. No. 5,135,092 granted Aug. 4, 1992 to Johann Jäckel for "APPARATUS FOR TRANSMITTING TORQUE".

The means for transmitting torque from the flywheel 2 to the flywheel 3 by way of the energy storing elements 10 (i.e., the output element of the damper 9) comprises a set of substantially radially outwardly extending arms 21 forming part of a disc-shaped stressing member 22 affixed to the secondary flywheel 3. The output element of the damper 9 can comprise more than a single disc-shaped stressing member 22. The arms 21 of the illustrated stressing member 22 alternate with the energy storing elements 10, i.e., they extend into the compartment 12 of the chamber 11 to be contacted by the adjacent end convolutions of the respective energy storing elements 10. The radially innermost portion or root portion 23 of the illustrated single stressing member 22 is of one piece with the secondary flywheel 3. However, it is equally within the purview of the invention to provide one or more discrete stressing members 22 which are affixed to the secondary flywheel 3 and include arms 21 extending into the compartment 12 between pairs of neighboring energy storing elements 10. When the flywheels 2, 3 assume their neutral positions (i.e., when the energy storing elements 10 are not stressed by the arms 21 so that their end convolutions are free to bear against the adjacent pockets of the portion 14 and wall 19 of the primary flywheel 2 (because the damper 9 is not called upon to transmit torque), each arm 21 is disposed between a pocket of the portion 14 and a pocket of the wall 19.

The arms 21 are preferably of one piece with the secondary flywheel 3 if the latter is a forging or a stamping. This renders it possible to form the arms 21 simultaneously with the shaping of the remaining part of the secondary flywheel 3. Furthermore, such mode of making the arms 21 (of one piece with the secondary flywheel 3) reduces the likelihood of the separation of separately produced arms from the major part of the secondary flywheel, e.g., at the locations of welded, riveted or otherwise formed connections between such separately produced arms and the major part of the secondary flywheel. Still further, the radially inner portions or root portions 23 of the stressing member 22 (i.e., those portions which are most likely to break if a set of separately produced arms is to be welded or otherwise affixed to a separately produced secondary flywheel) are strengthened as a result of material flow when a blank is converted into the illustrated flywheel 3 in a suitable stamping or other machine. Thus, the making of the illustrated secondary flywheel 3 results in a strengthening of those portions (23) which are most likely to break or become detached from a flywheel which is not of one piece with the arms 21. In other words, the reliability of the illustrated torque transmitting apparatus can be increased and its useful life can be prolonged by the aforedescribed expedient of making the arms 21 of one piece with the major part of the secondary flywheel 3.

It is further possible to convert a one-piece-blank into the illustrated secondary flywheel 3 and its arms 21 by resorting to one or more material removing operations. Thus, one can select a blank whose radius matches the distance of the axis X—X from the radially outermost portion of an arm 21, and such blank is thereupon machined to form the arms 21 by removing material radially inwardly from the periphery of the blank, i.e., between neighboring arms 21, as well as axially so that the thickness of the arms 21 (as seen in the direction of the axis X—X) is less than the thickness of the major part of the secondary flywheel. The removal of material in the direction of the axis X—X can take place at one side or at both sides of the blank, i.e., the arms 21 need not extend radially outwardly beyond one side of the flywheel 3 (as actually shown in FIG. 1) but can be located between the two sides. This depends upon the extent to which the secondary flywheel 3 extends into the primary flywheel 2. All that counts is to ensure that the arms 21 will be located between a pocket of the portion 14 and a pocket of the wall 19 when the damper 9 is not called upon to transmit torque from the flywheel 2 to the flywheel 3.

For example, the removal of material from a blank which is to be converted into the illustrated flywheel 3 (which is of one piece with the arms 21) can take place during treatment of a friction surface 3a of the flywheel 3, namely the surface which is to contact the adjacent friction linings 5c of the clutch disc 5. The illustrated flywheel 3 can be made of steel and, if desired or necessary, such one-piece flywheel can be subjected to additional treatment to harden the root portions 23 of the stressing member 22 in order to further reduce the likelihood of separation of the arms 21 from the major part of the flywheel 3. For example, the root portions 23 can be subjected to an induction hardening treatment.

The left-hand side of the secondary flywheel 3 (as viewed in FIG. 1) can be configurated in such a way that its area is increased, e.g., by grooving, by the provision of numerous diamond-shaped or otherwise configurated protuberances and/or in any other suitable manner to enhance the dissipation of heat which develops when the friction surface 3a slides relative to the adjacent friction linings 5c and/or vice versa. In addition, such configuration of the left-hand side of the flywheel 3 promotes desirable cooling of this flywheel by currents of cool atmospheric air which can be circulated in the space between the flywheels 2 and 3 radially inwardly of the annular chamber 11. The aforediscussed shaping of the left-hand side of the secondary flywheel 3 can take place simultaneously with a calibrating treatment. It has been found that the provision of a number of diamond-shaped protuberances results in a substantial increase of the heat-dissipating area of the left-hand side of the secondary flywheel. Similar results can be obtained by cutting into the left-hand side of the flywheel 3 a spiral groove, at least in the region opposite the friction surface 3a. Still further, it is possible to increase the area of the left-hand side of the flywheel 3 by employing a ring-shaped milling tool which is caused to penetrate into the flywheel 3 at a plurality of locations as seen in the radial and circumferential directions of this flywheel. All that counts is to ensure that the flywheel 3 can dissipate substantial amounts of heat in order to prevent an overheating of the primary flywheel 2 and of the lubricant which is confined in and at least partially fills the chamber 11.

The chamber 11 is sealed from the atmosphere by two annular seating elements 24 and 25. The sealing element 24 is a one-piece membrane. The radially innermost portion of the sealing element 24 extends in substantial parallelism with the axis X—X and abuts the radially inner portion 14 of the main section 13 of the primary flywheel 2. The radially outermost portion of the sealing element 24 also extends in substantial parallelism with the axis X—X and sealingly engages the flywheel 3 in the region of the root portions 23 of the stressing member 22. The flywheel 3 centers the membrane-like sealing element 24. The major portion of the sealing element 24 extends at least substantially radially of the axis X—X between the left-hand side of the flywheel 3 and the right-hand side of the major section 13 of the primary flywheel 2. The sealing element 24 is resilient and is centered by the secondary flywheel 3 in axially stressed condition so that its radially innermost portion bears against the adjacent portion of the primary flywheel 2. As can be seen in FIG. 1, the sealing element 24 can extend radially inwardly from the root portions 23 of the stressing member 22 and close to the heads 33 of threaded fasteners 8 in the bores or holes 7 of the primary flywheel 2. However, it is equally within the purview of the invention to shorten the chamber 11 (as seen in the radial direction of the flywheel 2) by having the radially inner portion of the sealing element 24 abut the right-hand side of the main section 13 of the primary flywheel 2 radially outwardly of and at a greater or lesser distance from the heads 33 of the threaded fasteners 8. As can be seen in FIG. 1, the radially outer portion 18 of the main section 13 of the primary flywheel 2 carries a starter gear 26 which can be welded to a cylindrical part of the portion 18 to the left of the compartment 12 for the energy storing elements 10 of the damper 9. The starter gear 26 can be welded or riveted to or shrunk onto the portion 14.

The second sealing element 25 includes a first portion 27 having a substantially L-shaped cross-sectional outline and a second portion 28 which is a spring (e.g., a diaphragm spring) acting in the direction of the axis X—X. The radially outer portion of the spring 28 reacts against the adjacent radially innermost portion 19a of the wall 19 and its radially inner portion bears against the portion 27 to urge the latter in a direction toward the main section 13 of the primary flywheel 2. The angle between the two legs of the section 27 is or can be somewhat less than 90°, the radially extending leg of the portion 27 abuts the spring 28, and the axially extending leg of the portion 27 conforms to the outer side of the adjacent axially extending guide portion 29 of the clutch housing 30. Since the spring 28 bears against the radially extending leg of the portion 27 while the axially extending leg of the portion 27 sealingly engages the portion 29 of the housing 30 and the spring 28 reacts against the portion 19a of the wall 19, the chamber 11 is sealed from the atmosphere in the region where the portion 19a of the wall 19 is centered by the guide portion 29 of the housing 30.

As a rule, the sealing elements 24 and 25 merely serve to prevent penetration of impurities into the chamber 11. The reason is that the supply of lubricant only partially fills the chamber 11 (e.g., only the compartment 12) and the lubricant is preferably highly viscous (it can be a grease or an oil of paste-like consistency) so that it does not tend to escape from the compartment 12. The only instance when the sealing element 24 and/or 25 is expected to be called upon to prevent the escape of lubricant from the chamber 11 is when the supply of lubricant is overheated with attendant reduction of its viscosity.

The friction clutch 4 and the composite flywheel 1 together constitute a fully assembled module or unit which can be affixed to the output element of an engine by means of the threaded fasteners 8 whose shanks can be driven into complementary tapped bores or holes in the output element of the engine. It is preferred to subject the module to a balancing or truing action prior to attachment to the output element of an engine, and the thus treated module is ready to be shipped to an automobile assembling plant or to storage. The fully assembled module including the composite flywheel 1 and the friction clutch 4 (including the clutch disc 5) renders it possible to simplify the installation of the module in a motor vehicle and to dispense with a number of steps which are necessary if the constituents of the module are to be assembled subsequent to mounting of the primary flywheel 2 on the output element of an engine. For example, the clutch disc 5 can be centered relative to the pressure plate 31 prior to attachment of the primary flywheel 2 to the output element of the engine. Furthermore, the clutch disc 5 can be assembled with the secondary flywheel 3 and the clutch housing 30 can be affixed to the secondary flywheel 3. Still further, one can dispense with the customary centering mandrel which must be employed if the constituents of the torque transmitting apparatus are to be assembled upon attachment of the primary flywheel 2 to the output element of the engine. The secondary flywheel 3 need not be centered relative to the primary flywheel 2 subsequent to the attachment of the primary flywheel to an output element. Moreover, the fasteners 8 can be inserted into the holes or bores 7 so that they are merely rotated to drive their shanks into the complementary tapped bores or holes of the output element of an engine whereby the entire module is .properly attached to such output element. Still further, it is not necessary to withdraw the centering mandrel from the axial passage of the properly mounted module because the centering mandrel can be dispensed with.

The antifriction bearing 6 is installed between the protuberance 15 and the adjacent radially inner portion of the secondary flywheel 3 during assembly of the module. The threaded fasteners 8 are preferably mounted in the primary flywheel 2 during assembly of the module, and their shanks are confined in the respective bores or holes 7 so that the module can be safely manipulated in storage or in an automobile assembling plant without losing any of the fasteners. To this end, the shanks of the fasteners 8 can be received in the respective bores or holes 7 jointly with pieces of elastomeric material or other inserts which can yield when the fasteners are turned and urged axially so that their shanks are compelled to advance into the tapped holes of the output element of an engine. For example, the heads 33 of the fasteners 8 can be provided with hexagonal or other polygonal sockets for the working end of a torque transmitting tool which is used to drive the fasteners into the output element of the engine. Reference may be had, for example, to commonly owned U.S. Pat. No. 5,160,007 granted Nov. 3, 1992 to Wolfgang Reik et al. for "APPARATUS FOR TRANSMITTING TORQUE IN THE POWER TRAINS OF MOTOR VEHICLES". This patent shows a tool adapted to be used to transmit torque to fasteners which are to attach a flywheel to the output element of an engine. The patent to Reik et al. also shows and describes the aforementioned inserts as well as an engine which transmits torque to the primary flywheel of a torque transmitting apparatus and a transmission which receives torque from the clutch disc of a friction clutch or the secondary flywheel.

The clutch disc 5 of the aforementioned module is centered with reference to the composite flywheel 1 and is clamped between the secondary flywheel 3 and the pressure plate 31. Thus, the axis of rotation of the clutch disc 5 coincides with the axis of the output element of the engine as soon as the improved torque transmitting apparatus is properly affixed to the output element. Furthermore, the clutch disc 5 is clamped between the friction surface 3a of the secondary flywheel 3 and the left-hand side of the pressure plate 31 of the friction clutch 4 in such an orientation that each of its openings or windows 32 registers with one of the holes or bores 7 in the radially inner portion 14 of the main section 13 of the primary flywheel 2. This ensures that the working end of the aforementioned torque transmitting tool can be readily introduced into the sockets of the heads 33 of threaded fasteners 8 to drive the shanks of such fasteners into the tapped bores or holes of the output element of the engine. The diameters of the openings 32 are smaller than the diameters of the heads 33 of the fasteners 8, i.e., the fasteners 8 cannot be lost because their heads cannot pass through the aligned openings 32. Thus, once the clutch disc 5 is properly clamped between the pressure plate 31 and the flywheel 3, the fasteners 8 cannot be lost or displaced because their heads are confined between the portion 14 of the primary flywheel 2 and the carrier 5b of the clutch disc 5 while the openings 32 afford access to the sockets in the aligned heads 33.

The friction clutch 4 further comprises a clutch spring 34, here shown as a diaphragm spring, which reacts against the radially extending main portion 30a of the housing 30 and bears against the pressure plate 31 to urge the latter against the adjacent friction linings 5c in the engaged condition of the friction clutch. The diaphragm spring 34 comprises a circumferentially complete radially outer portion which can bear (directly or indirectly) against the pressure plate 31, and radially inwardly extending portions in the form of resilient prongs 34a. The pronged portion of the diaphragm spring 34 is also provided with openings or windows 35 each of which registers with an opening 32 in the carrier 5b of the properly clamped and centered clutch disc 5. This enables the working end of the aforementioned torque transmitting tool to pass first through an opening 35, thereupon through the aligned opening 32 and thereafter into the socket of the respective head 33. The openings 35 can constitute enlargements of the corresponding radially extending slots between neighboring prongs 34a of the diaphragm spring 34. Additional openings or windows 36 are provided in the secondary flywheel 3 in axial alignment with the openings 32 of the carrier 5b of the clutch disc 5 and hence in axial alignment with the openings 35 of the diaphragm spring 34 as well as with the heads 33 of the corresponding fasteners 8.

The friction clutch 4 which is shown in FIG. 1 is a so-called push-type clutch. This means that the clutch 4 can be disengaged to permit rotation of the flywheels 2, 3 independently of the clutch disc 5 and of the transmission by pushing the tips 51 of the prongs 34a axially toward the clutch disc 5. This causes the circumferentially complete radially outer portion of the diaphragm spring 34 to relax the bias upon the pressure plate 31 so that the latter can be moved axially of and away from the clutch disc 5 and flywheel 3 under the action of substantially tangentially extending leaf springs 39 serving to non-rotatably, but axially movably, connect the pressure plate 31 to the housing 30 of the friction clutch 4.

The invention can be embodied with equal advantage in a method of assembling a torque transmitting apparatus wherein the friction clutch is a so-called pull-type clutch, i.e., wherein the prongs 34a must be pulled axially of and away from the pressure plate 31 in order to enable the pressure plate to move away from the adjacent friction linings 5c.

The diaphragm spring 34 of the illustrated friction clutch 4 is tiltable relative to the radially extending portion 30a of the housing 30 between a ring-shaped first seat 37 and a ring-shaped second seat 38. These seats are maintained in the illustrated positions by a set of rivets 40 which perform the additional function of coupling the leaf springs 39 to the housing 30 so that the leaf springs can disengage the clutch by pulling the pressure plate 31 away from the clutch disc 5 when the tips 51 of the prongs 34a are pushed toward the pressure plate.

Several discrete leaf springs 39 can be replaced with a single (one-piece) resilient element (not specifically shown) which is installed in stressed condition so as to urge the pressure plate 31 away from the adjacent friction linings 5c while simultaneously preventing rotation of the pressure plate 31 and the housing 30 relative to each other. The reference character 41 denotes in FIG. 1 one of the rivets which are used to secure the leaf springs 39 to radially inwardly extending projections of the pressure plate 31. The just mentioned projections of the pressure plate 31 extend radially inwardly beyond the friction linings 5c and the friction surface 3a of the secondary flywheel 3. However, it is equally possible to employ blind rivets as a means for attaching the leaf springs 39 to the pressure plate 31 in alignment with the friction linings 5c, i.e., to employ connecting means forming integral parts of (i.e., being of one piece with) the pressure plate 31. This is desirable and advantageous if the pressure plate 31 constitutes a forging or a stamping.

The radially outer portion of the diaphragm spring 34 can bear directly against suitable projections of the pressure plate 31 in the engaged condition of the friction clutch 4. Reference may be had, for example, to the aforementioned U.S. Pat. No. 5,160,007 to Wolfgang Reik et al. In the apparatus of FIG. 1, the friction clutch 4 comprises a ring-shaped insert 42 which is fitted into a groove of the pressure plate 31 and is biased by the radially outer portion of the diaphragm spring 34 in the engaged condition of the clutch. The insert 42 can constitute a one-piece circumferentially complete ring or it can comprise an annulus of discrete arcuate or otherwise configured sections which together perform the task of biasing the pressure plate 31 against the adjacent friction linings 5c in the engaged condition of the clutch 4. If desired or necessary, the insert 42 can be affixed to the pressure plate 31.

If the illustrated push-type friction clutch 4 is replaced with a pull-type clutch, the leaf springs 39 are preferably secured to the pressure plate 31 radially outwardly of the diaphragm spring 34 and it is advisable to provide discrete rivets or other suitable connectors which secure the leaf springs to the clutch housing 30, i.e., the rivets 40 then merely perform the function of affixing the seats 37, 38 and the radially outer portion of the diaphragm spring 34 to the radially extending portion 30a of the housing 30.

The openings 36 of the secondary flywheel 3 can serve as a means for permitting currents of cool atmospheric air to withdraw heat from the secondary flywheel. The cooling action upon the secondary flywheel 3 can be intensified by providing additional openings or passages in the secondary flywheel and in certain other parts of the torque transmitting apparatus. FIG. 1 shows passages 43, 43a in the housing 30 and passages 44, 45 in the secondary flywheel 3. Such passages permit circulation of air which withdraws heat from the flywheel 3 as well as from other parts which should not be overheated in order to prolong the useful life of the torque transmitting apparatus. As already mentioned before, it is advisable to prevent overheating of the lubricant which fills at least a portion of the annular chamber 11 in order to ensure that such lubricant will not tend to escape from the chamber along the sealing element 24 or 25. Adequate cooling not only prevents undue liquefaction of the entrapped lubricant, but also contributes to longer useful life of the entire apparatus.

The initial steps of the method of the present invention include the assembly of an incomplete module including the friction clutch 4 and its clutch disc 5, the sealing element 24 and the secondary flywheel 3. The next step includes the assembly of the incomplete module (including the clutch 4, its clutch disc 5, the sealing element 24 and the secondary flywheel 3) with the main section 13 of the primary flywheel 2; at such time, the bearing 6 is already installed on the protuberance 15 of the main section 13 or in the central opening of the secondary flywheel 3. Furthermore, the fasteners 8 have already been inserted into and are releasably held in the holes or bores 7 of the radially inner portion 14 of the main section 13. The next-following step includes the introduction of helical energy storing elements 10 of the damper 9 into those portions of the compartment 12 which are defined by the radially outer portion 18 of the main section 13. The wall 19 is slipped onto the cylindrical guide portion 29 of the housing 30, and the assembly of housing 30 and wall 19 is thereupon moved toward the flywheel 3 so that the radially outer portion of the wall 19 abuts the adjacent end of the radially outer portion 18 of the main section 13. The wall 19 is thereupon sealingly affixed to the portion 18 of the main section 13 by forming the welded seam 20. The advancement of the wall 19 on the guide portion 29 of the housing 30 toward the position of FIG. 1 involves a pushing of the sealing element 25 by the radially inner portion 19a of the wall 19 so that the portions of the sealing element 25 slide toward the positions of FIG. 1 while the wall 19 advances toward abutment with portion 18 of the main section 13. When the wall 19 reaches the position of FIG. 1, the wall portion 19a engages the diaphragm spring 28 and the latter engages the substantially radially outwardly extending leg of the portion 27. When the making of the welded seam 20 is completed, the diaphragm spring 28 of the sealing element 25 can compensate for some resilient unbending or displacement (if any) of certain constituents of the module in that the diaphragm spring 28 dissipates some energy and assumes the somewhat inclined position of FIG. 1 in which it seals the space between the radially inner portion 19a of the wall 19 and the adjacent substantially outwardly extending leg of the portion 27 of the sealing element 25. Thus, the sealing action of the element 25 remains intact even if the making of the welded seam 20 is followed by some shifting of the adjoining parts relative to each other.

The thus obtained module can further include a pilot bearing (not shown) in the radially inner portion of the protuberance 15 of the main section 13 of the primary flywheel 2. The pilot bearing can receive the front end of the input shaft of a transmission which receives torque from the clutch disc 5. It is further possible to install one or more friction generating devices between the flywheels 2 and 3. For example, it is possible to install one or more friction generating devices which are operative whenever the flywheel 2 turns relative to the flywheel 3 and/or vice versa, as well as one or more friction generating devices which respond only subsequent to a certain initial angular displacement of the two flywheels relative to one another. Reference may be had, for example, to the aforementioned commonly owned U.S. Pat. No. 5,135,092 to Jäckel.

Figure 3:
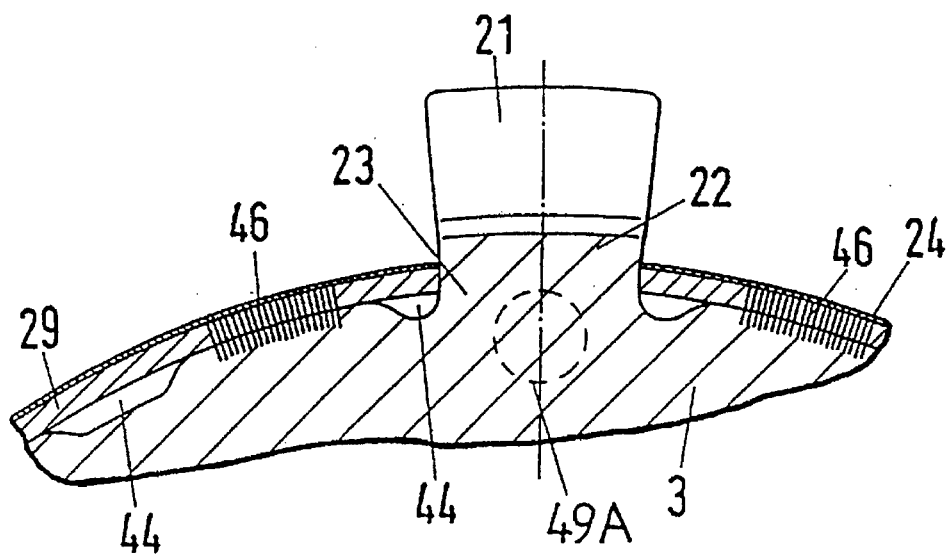
FIG. 3 is a fragmentary sectional view of the apparatus substantially as seen in the direction of the arrows from the line III—III in FIG. 2.
Figure 2:
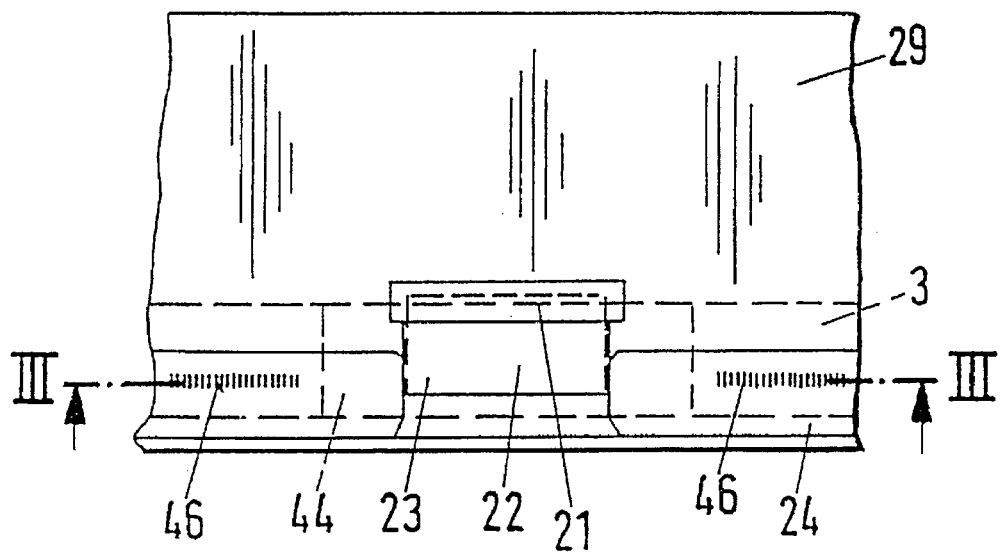
FIG. 2 is a fragmentary plan view of the apparatus substantially as seen in the direction of arrow II in FIG. 1.
Figure 4:
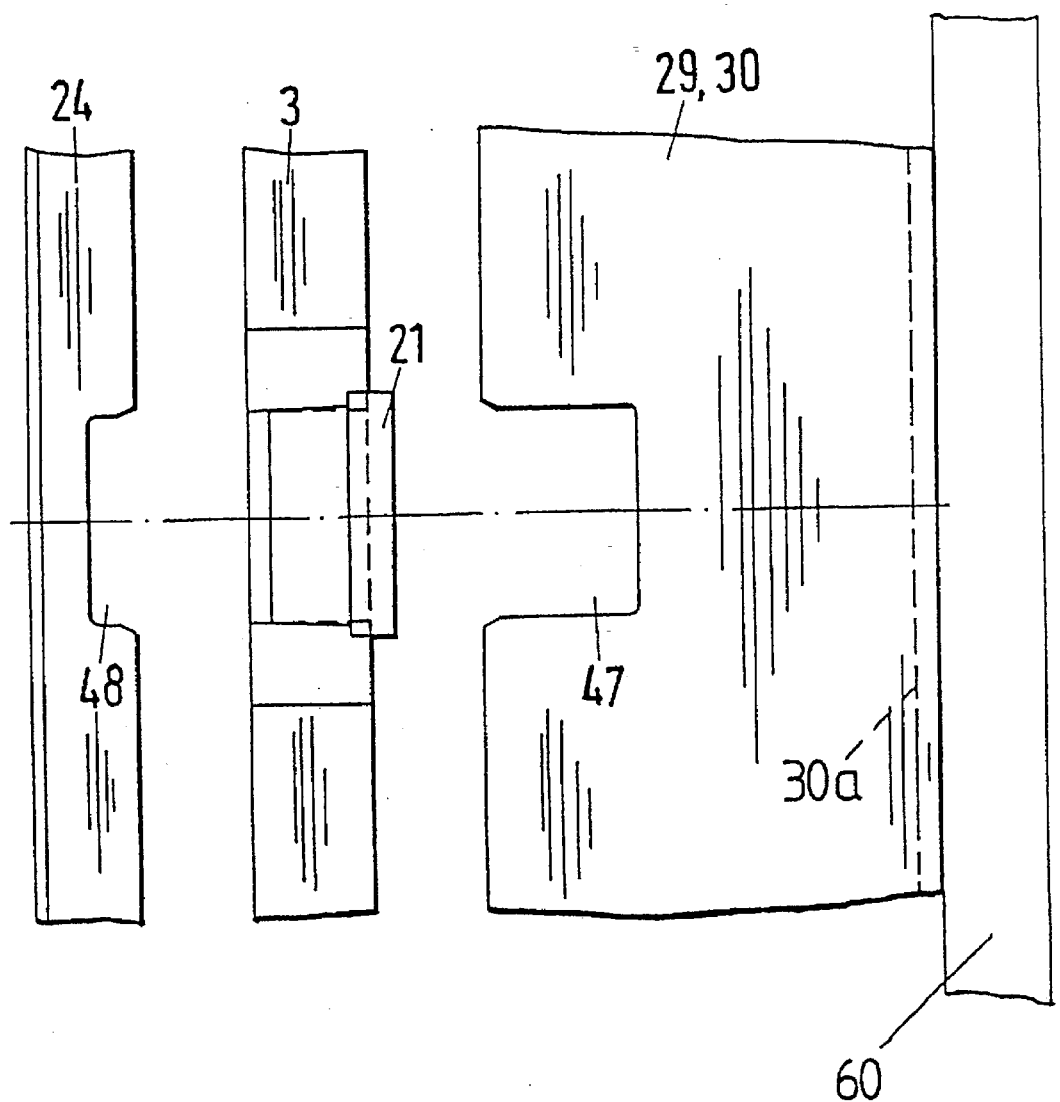
FIG. 4 is a fragmentary exploded view of those parts of the torque transmitting apparatus which are shown in FIGS. 2 and 3.

FIGS. 2 to 4 illustrate portions of certain constituents of the aforementioned module prior and subsequent to their assembly. The sealing element 24 which is shown in FIGS. 2 to 4 constitutes but one of a number of various sealing elements which can be utilized in the improved apparatus. The constituents of the friction clutch 4 are assembled with each other prior to assembly of the parts (including the cylindrical guide portion 29 of the housing 30, the secondary flywheel 3 and the sealing element 24) which are illustrated in FIGS. 2 to 4. The pressure plate 31 of the friction clutch 4 carries the annular insert 42, and this pressure plate is already affixed (with freedom of movement in the directions of its axis X—X) relative to the housing 30 because the rivets 40 secure one end portion of each leaf spring 39 to the radially extending portion 30a of the housing 30 and the rivets 41 connect the other end portions of the leaf springs 39 to the radially inwardly extending projections of the pressure plate 31. The rivets 40 further serve to attach the radially outer portion of the diaphragm spring 34 to the housing 30 in such a way that the diaphragm spring is tiltable between the two seats 37 and 38.

The clutch disc 5 is placed between the secondary flywheel 3 and the pressure plate 31 of the friction clutch 4 before the wall 19 is welded to the portion 18 of the main section 13, and the clutch disc is centered relative to the friction surface 3a of the flywheel 3 as well as relative to the pressure plate 31. Once the wall 19 is affixed to the portion 18 of the main section 13, the hub 5a of the clutch disc 5 is ready to be non-rotatably slipped onto the input element of a transmission or onto an intermediate shaft of a power train between the secondary flywheel 3 and one or more wheels of a motor vehicle.

As already described in connection with FIG. 1, and as even more clearly shown in FIG. 4, the thickness of the arms 21 is less than the thickness of the major portion of the secondary flywheel 3. Furthermore, the arms 21 are offset in the direction of the axis X—X, namely toward the radially extending portion 30a of the housing 30. In other words, the arms 21 are not disposed midway between the friction surface 3a and the other surface of the major portion of the secondary flywheel 3.

FIGS. 2 and 3 show several passages 44 which are provided in the secondary flywheel 3 to permit circulation of cool atmospheric air in order to withdraw heat from the secondary flywheel. The illustrated passages 44 extend in substantial parallelism with the axis of the flywheel 3, i.e., in substantial parallelism with the axis X—X of the pressure plate 31 because the two axes coincide upon completed assembly of the module including the flywheel 3 and the pressure plate 31. The passages 45 and the openings or windows 36 of the secondary flywheel 3 are disposed radially inwardly of the passages 44 and radially inwardly of the friction surface 3a. As already mentioned before, the openings or windows 36 of the secondary flywheel 3 register with the openings or windows 32 of the clutch disc 5 when the module, including the parts shown in FIGS. 2 to 4, is properly assembled. At such time, the openings or windows 32 also register with the openings or windows 35 in and between the prongs 34a of the diaphragm spring 34 forming part of the friction clutch 4. Furthermore, when the making of the welded seam 20 is completed, the openings or windows 36 of the secondary flywheel 3 register with the holes or bores 7 of the primary flywheel 2.

The central opening of the secondary flywheel 3 (namely the opening for the antifriction bearing 6) can be formed simultaneously with the making of the secondary flywheel in a stamping or other suitable machine. In other words, a stamping which constitutes the secondary flywheel 3 is already formed with a central opening which is dimensioned to snugly receive the outer race 17 of the bearing 6 and, if necessary, a portion of the thermal barrier 6a. The aforementioned openings or windows, passages and holes can be formed (e.g., by stamping) simultaneously with the making of the respective parts, or they can be formed later on, e.g., in a suitable drilling or boring machine, not shown. It is to be noted that the illustrated passages and windows or openings constitute but one form of means for affording access to the heads 33 of the threaded fasteners 8 and/or of permitting adequate cooling of the secondary flywheel 3, of the lubricant in the chamber 11 and/or of other components of the module. Alternatively, certain openings or windows and/or passages can be formed simultaneously with the making and/or shaping of the respective parts, and the remaining openings or windows and/or passages can be formed later on by drilling or by resorting to other material removing techniques.

In order to permit convenient and accurate assembly of the clutch housing 30, secondary flywheel 3 and sealing element 24 in axial alignment with each other, the housing 30 is formed with recesses or cutouts 47 and the sealing element 24 is provided with recesses or cutouts 48 which are aligned with each other (FIG. 4) and with the arms 21 during assembly of the module (as seen in the axial direction of the secondary flywheel). The just mentioned recesses 47 and 48 can further serve to ensure accurate positioning of the parts of FIGS. 2 to 4 as seen in the circumferential direction of the secondary flywheel 3. The recess or recesses 47 in the cylindrical guide portion 29 of the housing 30 have a depth (as measured in the direction of the axis X—X and away from the protuberance 15 of the primary flywheel 2) which suffices to ensure that, once the secondary flywheel 3 and the primary flywheel 2 assume the axial positions of FIG. 1, the diaphragm spring 34 of the friction clutch 4 has stored adequate energy to guarantee that the secondary flywheel 3 can transmit torque to the clutch disc 5 without any slippage in fully engaged condition of the friction clutch.

Adequate stressing of the diaphragm spring 34 is ensured by assembling the torque transmitting apparatus and by mounting such apparatus on the output element of an engine in accordance with the method of the present invention. The method can be said to include measuring steps and assembling steps. The first step involves clamping the radially inwardly extending portion 30a of the housing 30 in a selected axial position by clamping device 60 (FIG. 4). At such time, the pressure plate 31 is already connected to the housing 30 by the leaf springs 39 (i.e., the rivets 40 affix the leaf springs 39 to the housing portion 30a and the rivets 41 connect the leaf springs to the pressure plate). Thus, the radially extending portion 30a of the housing 30 already carries the diaphragm spring 34 and the seats 37, 38. The leaf springs 39 are ready to transmit torque between the housing 30 and the pressure plate 31 as well as to urge the pressure plate 31 toward the radially extending portion 30a of the housing 30 so that the clutch 4 is automatically disengaged in response to axial movement of the radially innermost portions 51 of the prongs 34a toward the clutch disc 5.

FIG. 1 shows two distance measuring devices 49 and 50 disposed at that side of the diaphragm spring 34 which faces away from the pressure plate 31. The device 49 engages the circumferentially complete radially outer portion of the diaphragm spring 34 at a first distance from the axis X—X, namely at the same distance as the locations of contact between the insert 42 and the left-hand side of the spring 34. If the insert 42 is considered an integral part of the pressure plate 31 or an integral part of the diaphragm spring 34, the location of the distance measuring device 49 coincides with the locus of contact between the parts 31, 34 in the engaged condition of the friction clutch 4. It can be said that the insert 42 and the distance measuring device 49 engaged the respective sides of the diaphragm spring 34 at the same distance from the axis X—X. The device 49 extends through one of the passages 43a (or through the single passage 43a) in the radially extending portion 30a of the housing 30. It is equally within the purview of the invention to position the device 49 in such a way that its distance from the axis X—X departs from the distance between such axis and the locations of contact between the diaphragm spring 34 and the insert 42.

The other distance measuring device 50 is positioned to engage the radially innermost portion or tip 51 of at least one of the prongs 34a forming part of the diaphragm spring 34. If the illustrated push-type friction clutch 4 is to be disengaged, a bearing or another suitable disengaging device (not shown) is caused to move against the tips 51 of the prongs 34a so that the diaphragm spring 34 is tilted between the seats 38 and 39 and its radially outer portion moves away from the pressure plate 31. However, and as mentioned hereinbefore, the novel method is not limited to the assembly of torque transmitting apparatus which embody push-type friction clutches but can be put to use with the same advantage in connection with the assembly of apparatus employing pull-type friction clutches-including those employing separate clutch engaging and clutch disengaging elements.

When the pressure plate 31 is moved axially toward the fixedly held housing 30 of the friction clutch 4, the force which is required to move the plate 31 against the bias of the diaphragm spring 34 is measured by at least one force measuring device 49A (FIG. 3). At the same time, the distance measuring device 49 (one can employ one or more devices 49) determines the extent of movement of the radially outer portion of the diaphragm spring 34 in response to axial movement of the pressure plate 31 toward the radially extending portion 30a of the housing 30. Still further, the device 50 measures the distance which is covered by the tips 51 of the prongs 34a during tilting of the diaphragm spring 34 by the oncoming pressure plate 31.

It is often desirable to employ two or more distance measuring devices 49 and/or two or more distance measuring devices 50 which are distributed in the circumferential direction of the diaphragm spring 34. This enables a computer 61 (FIG. 1) to average the signals from the devices 49 and 50 so that the averaged signals more accurately denote the extent of axial displacement of the radially outer portion of the diaphragm spring 34 (device or devices 49) and the extent of axial displacement of the tips 51 of the prongs 34a in response to movement of the pressure plate 31 toward the radially extending portion 30a of the housing 30 while the housing is held (by clamping device 60) against movement in the directions of the axis X—X. The utilization of plural devices 49 and/or 50 reduces the likelihood of improper initial stressing of the diaphragm spring 34 in that the averaged signals which are generated by several devices 49 are more likely to accurately denote the axial displacement of the radially outer portion of the diaphragm spring 34, and the averaged signals from several devices 50 are more likely to accurately denote the extent of axial movement of the tips 51 of the prongs 34a during that stage of the practice of the method of the present invention which involves the step of moving the pressure plate 31 toward the portion 30a of the housing 30.

The extent of axial displacement of the pressure plate 31 toward the portion 30a of the housing 30 is selected in such a way that the force measuring device 49A indicates the application of a force, the magnitude of which exceeds the contemplated or desired operating point of the diaphragm spring 34, namely that force which the diaphragm spring 34 applies to the insert 42 (and hence to the pressure plate 31) when the friction clutch 34 is fully engaged. For example, the pressure plate 31 can be moved toward the portion 30a of the housing 30 until a minimum of the bias of the diaphragm spring 34 is exceeded or until the radially outermost portion of the diaphragm spring 34 comes into actual abutment with the radially outermost part of the radially extending portion 30a of the housing 30. An advantage of the last mentioned procedure is that the stressing of the diaphragm spring 34 at which its radially outermost portion comes into actual abutment with the housing 30 is readily detectable. This will be readily appreciated since the magnitude of the force which must be applied to the pressure plate 31 (and is measured by the device 49A) increases abruptly and very substantially if the pressure plate 31 is to be moved further toward the portion 30a of the housing 30 when the radially outermost portion of the diaphragm spring 34 already abuts the housing. In other words, the characteristic curve of the diaphragm spring 34 exhibits a pronounced upward slope if the pressure plate 31 is to continue to move toward the housing portion 30a subsequent to actual engagement between the radially outermost portion of the diaphragm spring and the housing 30.

The next step involves a reduction of the force which is measured by the device 49A, i.e., the pressure plate 31 is caused to move axially and away from the portion 30a of the housing 30 because the diaphragm spring 34 is permitted to dissipate energy. The distance measuring devices 49 and 50 generate signals which denote the extent of movement of the respective portions of the diaphragm spring 34 (i.e., a movement of the radially outer portion of the diaphragm spring away from the housing portion 30a and a movement of the tips 51 of prongs 34a in a direction away from the pressure plate 31). The extent of axial movement of the pressure plate 31 away from the housing portion 30a can be selected in such a way that the bias of the diaphragm spring 34 is reduced below the operating point. The device 49A measures the bias of the diaphragm spring 34 upon the pressure plate 31.

The next-following step can involve permitting the diaphragm spring 34 to dissipate all of the stored energy.

The determination and selection of the operating point of the diaphragm spring 34 involve the processing of signals which are generated by the force measuring device 49A and by the distance measuring device 50 and/or 49. Such selection can be made by taking into consideration the entire range of forces between a maximum stressing of the diaphragm spring 34 and that stage when the diaphragm spring 34 is free to dissipate all of the energy (i.e., the entire characteristic curve of the spring 34), and it is equally possible to take into consideration the hysteresis. The parameters which are measured by the device 50 (i.e., the extent of movement of the tips 51 of prongs 34a in the direction of the axis X—X) can but need not always be taken into consideration during determination of the characteristic curve of the diaphragm spring 34 and the selection of the desired or optimal operating point. For example, the extent of axial movement of the tips 51 of the prongs 34a can be taken into consideration in order to ascertain the maximum space requirements of the torque transmitting apparatus under the hood of a motor vehicle.

In addition to the generation of signals which denote the positions of the tips 51 of the prongs 34a and the distance which the radially outermost portion of the diaphragm spring 34 covers during disengagement of the friction clutch 34, it is possible to utilize signals which denote certain additional parameters. Such additional parameters can include, for example, the inclination of the prongs 34a and the extent of movement of the radially outermost portion of the diaphragm spring 34 (i.e., a portion radially outwardly of the locus of contact between the device 49 and the diaphragm spring). All of these signals can be memorized and processed by the computer 61 in order to determine the desired or optimum operating point of the diaphragm spring 34. The computer 61 compares the information (desired values) which is supplied thereto by an operator with memorized information (signals) from the various force and distance measuring devices in order to transmit an output signal denoting the optimum operating point of the diaphragm spring 34. The signals which denoting the actually measured values can include the bias of the diaphragm spring 34 during stressing and unstressing, and the extent of movement of the diaphragm spring 34 at the distance measuring device or devices 49, at the radially outermost portion of the diaphragm spring, and at the device or devices 50. The information which is supplied to the computer 61 by an operator can include, for example, the desired bias of the diaphragm spring 34 inclusive of tolerances, a desired axial position of the prongs 34a and/or their tips 51 with a given range of tolerances, and a required minimal movement or distance due to wear. Additional parameters which can be considered in the selection of the operating point of the diaphragm spring 34 can include, for example, those which are necessary to ascertain the maximum space requirements of the torque transmitting apparatus all the way from the left-hand side of the primary flywheel 2 (i.e., from the locus of contact of the portion 14 with the output element of an engine) and the tips 51 of the prongs 34a (as measured in the direction of the axis X—X). This enables the designer or designers to ascertain whether or not the torque transmitting apparatus can be fitted under the hood of a particular motor vehicle.

The aforementioned module, including the friction clutch 4 (with the clutch disc 5 properly centered relative to the pressure plate 31), is thereupon assembled with the secondary flywheel 3. This involves the insertion of the secondary flywheel 3 into the axially extending cylindrical guide portion 29 of the housing 30 in such orientation that the guide portion 29 of the housing 30 automatically centers the flywheel 3 relative to the pressure plate 31 and clutch disc 5. The next step involves axial movement (e.g., pushing) of the secondary flywheel 3 toward the radially extending portion 30a of the housing 30 (see the arrow 62 in FIG. 1). The attendant axial displacement of the pressure plate 31 results in a change of inclination of the diaphragm spring 34, and the resulting axial movement of the diaphragm spring portion engaging the insert 42 is measured by the device 49. The axial displacement of the secondary flywheel 3 toward the housing portion 30a is terminated when the flywheel 3 reaches a predetermined axial position; this, too, is ascertained by the device 49. The axial movement of the secondary flywheel 3 toward the portion 30a of the housing 30 is terminated when the stressing or bias of the diaphragm spring 34 reaches the operating point, i.e., a point which has been determined by the computer 61 on the basis of signals furnished by the devices 49, 49A, 50 as well as (if desired) signals denoting one or more additional parameters, all as fully described hereinbefore.

The next step involves mounting the sealing element 24 at the side of the secondary flywheel 3 which faces away from the friction surface 3a. The radially outermost portion of a properly mounted sealing element 24 is centered by the leftmost portion of the cylindrical guide portion 29 of the housing 30.

The next-following step is illustrated in FIGS. 2 and 3. Thus, the secondary flywheel 3, the sealing element 24 and the cylindrical guide portion 29 of the housing 30 are fixedly secured to each other, e.g., by a series of welded seams 46. Such securing step is carried out subsequent to accurate centering of the housing 30, sealing element 24 and the secondary flywheel 3 relative to each other. As can be seen in FIG; 3, the securing means 46 need not constitute a circumferentially complete welded joint (such as the joint 20 between the portion 18 and the wall 19 of the primary flywheel 2). The illustrated securing means 46 includes a set of arcuate welded joints which extend in the circumferential direction of the cylindrical guide portion 29 of the housing 30. The making of the welded joints which together constitute the securing means 46 can involve the utilization of any one of a number of available welding or bonding techniques. The welding apparatus must be selected in such a way that each arcuate portion of the securing means 46 can be formed through the portion 29 of the housing 30, through the radially outermost portion of the sealing element 24 and into the radially outermost portion of the secondary flywheel 3. The welding operation begins at the exterior of the axially extending radially outermost portion of the sealing element 24, and the arcuate portions of the securing means 46 must extend through the portion 29 of the housing 30 and into the secondary flywheel 3. One presently preferred welding procedure involves the utilization of one or more laser beams. However, it is equally possible to resort to other welding techniques, as long as the securing means 46 is sufficiently strong to prevent any axial and/or angular displacement of the parts 3, 29 and 24 relative to each other. For example, one can resort to spot welding, to stored energy welding and/or to other available bonding techniques. Still further, the illustrated welded securing means 46 can be replaced or used jointly with other suitable means which can establish a reliable form-locking connection between the parts 3, 24 and 29. For example, one can resort to bolts or other threaded fasteners, to rivets or the like. Reference may be had, for example, to published German patent application Serial No. 41 17 584.

When the establishment of a reliable connection between the parts 3, 24 and 29 is completed, the resulting incomplete module is further completed so that it is ready to be affixed to the output element (e.g., a crankshaft) of an engine in a motor vehicle.

In the apparatus which is shown in FIGS. 1, 2, 3 and 4, the friction clutch 4 is affixed to the secondary flywheel 3 of a composite flywheel 1 further including a primary flywheel 2 which is directly secured to the output element of an engine or another prime mover. However, the improved method can be practiced with equal or similar advantage in connection with the assembly of apparatus having a single flywheel which is connected with the housing of the friction clutch and is connectable with the output element of an engine or the like. Such apparatus can be assembled into a module which is then ready for storage or for shipment to an automobile assembling plant or to another plant wherein the module is to be connected to the output element of a prime mover. A module of the just outlined character will be described with reference to FIG. 7. The modified module can be furnished with fasteners (such as the bolts 8 shown in FIG. 1) which are maintained in optimum positions for attachment of the single flywheel to an output element.

It is further possible to modify the apparatus of FIGS. 1, 2, 3 and 4 by replacing the one-piece housing 30 of the friction clutch 4 with a composite housing which is assembled of two or more discrete parts and wherein such parts are separably secured to each other. This renders it possible to gain access to certain components of the friction clutch in order to carry out an inspection, to repair and/or to otherwise adjust the module without it being necessary to detach the module from an output element which drives the primary flywheel 2 or the single flywheel as in the embodiment of FIG. 7.

Figure 8:
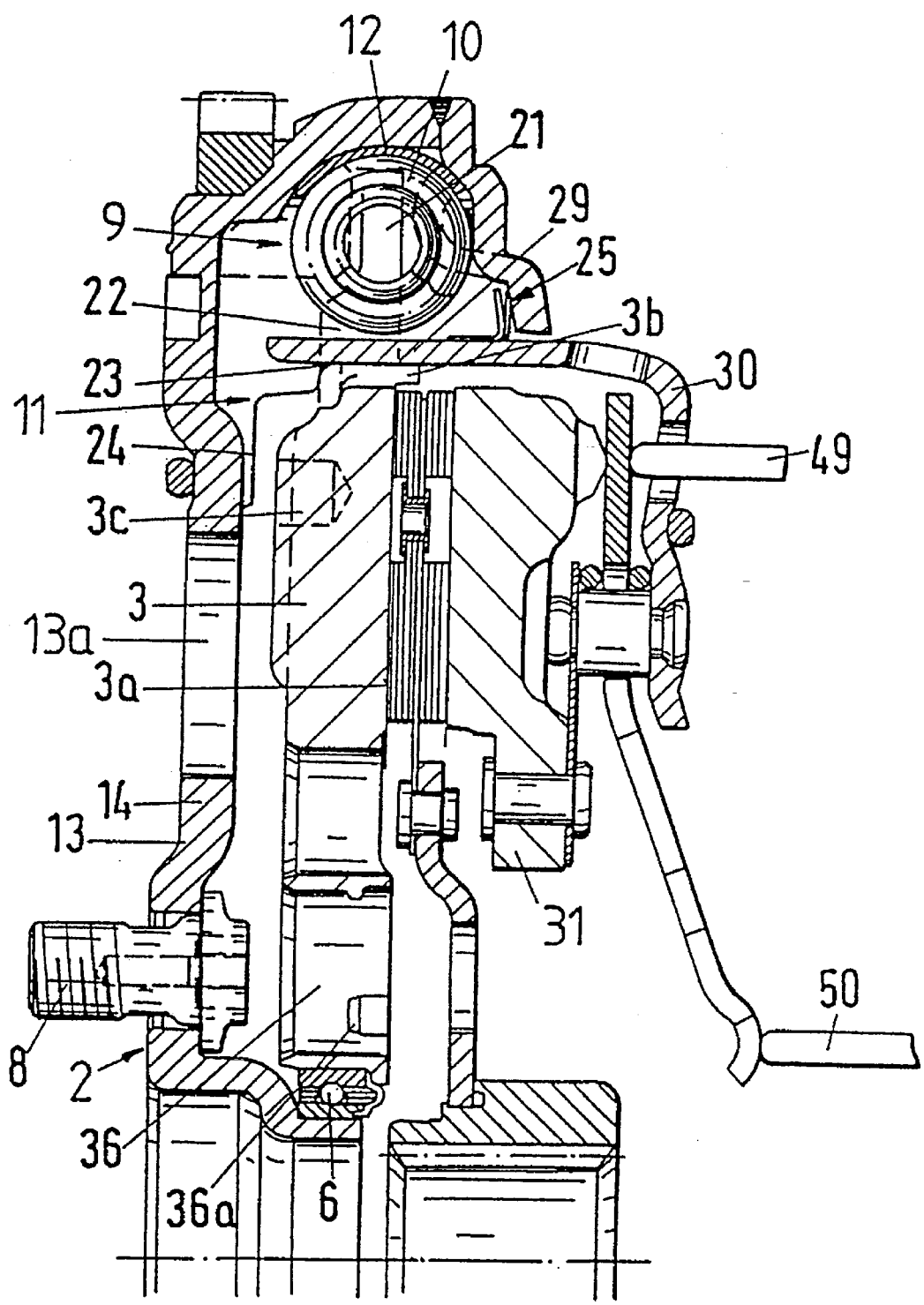
FIG. 8 is a fragmentary axial sectional view of a torque transmitting apparatus constituting a fourth modification of the apparatus which is shown in FIGS. 1 to 4.

FIG. 8 illustrates a torque transmitting apparatus which also comprises a composite flywheel, the same as the apparatus of FIG. 1. The secondary flywheel 3 of the apparatus which is shown in FIG. 8 is a forging. The sealing element 24 of FIG. 8 is relatively short (as seen radially of the flywheel 3) and extends radially of the flywheel 3. The radially outermost portion of the sealing element 24 of FIG. 8 is centered by the axially extending guide portion 29 of the clutch housing or cover 30. The sealing element 24 of FIG. 8 is installed in stressed condition so that its radially innermost portion bears against the adjacent side of the main section 13 of the primary flywheel 2. The main section 13 is provided with air conveying passages 13a which are disposed in its radially extending portion 14 radially inwardly of the sealing element 24.

The recesses or cutouts 47 (not specifically shown) in the cylindrical portion 29 of the housing 30 are dimensioned in such a way that the arms 21 of the stressing member 22 forming part of the secondary flywheel 3 are received therein with at least some play, as seen in the circumferential direction of the portion 29. In order to properly seal the chamber 11 radially inwardly, especially in the region of the compartment 12 for the arcuate energy storing elements 10 of the damper 9, the secondary flywheel 3 of FIG. 8 is provided with protuberances 3b which extend in parallel with the axis of the pressure plate 31 and away from the primary flywheel 2, and such protuberances are surrounded by the axially extending portion 29 of the housing 30.

FIG. 8 further shows that the left-hand side of the secondary flywheel 3 is provided with at least one balancing bore or hole 3c which is located opposite the friction surface 3a. Balancing or truing of the secondary flywheel 3 is necessary or desirable if the secondary flywheel is a forgoing. The windows or openings 36 of the secondary flywheel 3 shown in FIG. 8 provide room for one or more radially inwardly extending lugs 36a which serve to confine the heads of the threaded fasteners 8 in the space between the flywheels 2 and 3. Thus, the dimensions of each opening 36 still suffice to permit the insertion of a torque transmitting tool into the sockets of the heads of the respective fasteners 8; however, the lugs 36a prevent the heads of the fasteners 8 from advancing through the respective openings 36. The secondary flywheel 3 can be provided with two or more suitably distributed lugs 36a in each of its openings 36.

The antifriction bearing 6 of the apparatus which is shown in FIG. 8 is installed in such a way that the flywheels 2, 3 are held in predetermined optimum axial positions relative to each other. The radially outer portion of the secondary flywheel 3 is confined between the sealing elements 24 and 25 which are installed in stressed condition to permit certain axial displacements of the radially outer portion of the flywheel 3 against the opposition of the resilient sealing element 24 and/or against the bias of the diaphragm spring forming part of the composite sealing element 25. Such mounting of the radially outer portion of the secondary flywheel 3 enables the latter to perform slight wobbling movements relative to the primary flywheel 2 and/or to compensate for some wobbling of the primary flywheel when the apparatus of FIG. 8 is in actual use. The wobbling movements of the primary flywheel 2 and/or of the secondary flywheel 3 might be desirable or necessary in order to prevent overstressing of the connection (such as by fasteners 8) between the primary flywheel 2 and the output element of an engine.

To summarize the steps of one presently preferred embodiment of the method of assembling the apparatus of FIG. 1:

A force applying device (indicated by the arrow 62) is utilized to move the pressure plate 31 in the direction of the axis X—X and toward the housing 30 which is then held by the clamping device 60 so that the diaphragm spring 34 is caused to store energy and is stressed beyond the contemplated operating point. The device 49A measures the magnitude of the force which is applied by the device denoted by the arrow 62 and the device 49 measures the distance which is covered by the radially outer portion of the diaphragm spring 34 in response to the application of force by the insert 42, i.e., as a result of movement of the pressure plate 31 toward the radially extending portion 30a of the housing 30. The signals which are generated by the force measuring device 49A and by the distance measuring device 49 are transmitted to and are memorized by the computer 61.

The next step involves moving the housing 30 and plate 31 together (e.g., by the clamping or holding device 60) counter to the direction of earlier movement of the pressure plate 31, i.e., in a direction to the left, as viewed in FIG. 1 and against the opposition of the device 49A. Such movement is terminated when the thus applied force (e.g., by the device 60) exceeds the contemplated operating point of the diaphragm spring 34. The distance which is jointly covered by the housing 30 and the pressure plate 31 in a direction to the left is measured by the device 49 and/or by another distance measuring device, and the corresponding signals are again transmitted to and are memorized by the computer 61 together with the signals denoting the magnitude of the force which was applied to move the housing 30 and the diaphragm spring 34 in a direction to the left beyond the operating point of the diaphragm spring. The force applying device 60 and/or any other force transmitting device is then disengaged from the incomplete module including the friction clutch 4, and the computer 61 calculates a desired or optimal operating point for the diaphragm spring 34. A corresponding signal from the computer 61 is thereupon utilized to move the incomplete module toward the flywheel 3 until the bias of the diaphragm spring 34 reaches the calculated operating point. The housing 30 is thereupon affixed to the flywheel 3, as at 46, while the bias of the spring 34 continues to match the calculated operating point.

The force applying device or devices which are utilized for the practice of the improved method are or can be designed in such a way that the incomplete module including the friction clutch 4 is received therein with freedom of axial movement of the pressure plate 31 toward the housing portion 30a and/or vice versa. At the same time, the device 49A should be capable of measuring the magnitude of force which is to be applied to effect such movement of the pressure plate 31 and housing portion 30a toward each other, and the distance measuring device 49 should be capable of generating signals denoting the extent of axial movement of the pressure plate and the diaphragm spring toward each other, e.g., by moving the pressure plate toward the housing portion 30a while the latter is being held by the clamping device 60 against any movement in the direction of the axis X—X. It is advisable to design the force applying device 62 and the clamping or holding device 60 in such a way that the portion 30a of the housing 30 and/or the pressure plate 31 is confined to movement in the direction of the axis X—X, i.e., without any or without appreciable tilting and/or other stray movements.

It is presently preferred to employ a device 60 which can clamp the housing 30 against any movement relative thereto while the pressure plate 31 is being moved by the device 62 in the direction of the axis X—X toward the portion 30a of the housing 30. However, it is equally within the purview of the invention to fixedly hold the pressure plate 31 and to move the portion 30a of the housing 30 toward the thus clamped pressure plate in order to increase the bias of the diaphragm spring 34 beyond the anticipated operating point.

It is presently preferred to terminate the application of force to the incomplete module including the friction clutch 4 upon completion of the measurement of the force which is being applied by the device 62 to move the pressure plate 31 toward the housing portion 30a and upon completion of the measurement of the corresponding distance which is covered by the radially outer portion of the diaphragm spring 34 toward the housing portion 30a and is measured by the device 49.

It is further desirable and advantageous to measure at least one of the forces and at least one of the distances beyond a minimum point of the characteristic curve of the diaphragm spring 34. If the radially outermost portion of the diaphragm spring 34 is movable all the way into engagement with the radially extending portion 30a and/or with the axially extending portion 29 of the housing 30, at least one of the force and/or distance measuring steps can be carried out until and while the radially outermost portion of the diaphragm spring 34 abuts the housing 30. Determination of the minimum point of the characteristic curve of the diaphragm spring 34 and the measurement of force or forces after the diaphragm spring 34 comes into actual engagement with the housing 30 exhibit the advantage that these two parameters constitute important points of the characteristic curve of the diaphragm spring 34 and signals denoting such points can be readily ascertained and processed by the computer 61 or by any other suitable signal processing unit.

The positions of the tips 51 of the prongs 34a are monitored by the distance measuring device 50 in order to facilitate, for example, the determination of the space requirements of the torque transmitting apparatus in the direction of the axis X—X. The measurements by the device 50 can be continuous or intermittent; for example, the device 50 can transmit signals denoting the initial and final positions of the tips 51 prior to and upon the completion of the axial movement of the pressure plate 31 toward the portion 30a of the housing 30.

It is further possible to monitor certain other variable parameters, for example, the changes of inclination of the prongs 34a in response to tilting of the diaphragm spring 34 while the pressure plate 31 moves relative to the portion 30a of the housing 30 and/or vice versa. Another variable parameter which can be monitored by one or more distance measuring devices are the movements of one or more radially outermost portions of the diaphragm spring 34 relative to the housing portion 30a and/or 29. Signals denoting the positions of the radially outermost portions of the diaphragm spring 34 can be processed with other signals, such as those denoting various measured values or desired tolerance ranges represented by signals which are fed to the computer 61 by the person or persons in charge of carrying out the improved method.

By way of example only, it is often desirable and advantageous to transmit to an input of the computer 61 signals which denote the required minimum wear or nominal wear upon the torque transmitting apparatus and to process such signals together with signals from the devices 49, 49A or 49, 49A and 50 for determination of the preferred or optimum operating point of the diaphragm spring 34 (i.e., that bias of the diaphragm spring which is most satisfactory in the engaged condition of the friction clutch 4). Furthermore, it is often desirable and advantageous to optimize the operation of the torque transmitting apparatus by classifying certain components or constituents of the apparatus which are not subject to monitoring by the device 49, 49A, 50 (i.e., whose positions and/or bias are not monitored for the purpose of arriving at the, optimum operating point for the diaphragm spring 34) into several tolerance categories or classes.

The aforediscussed measurements can be carried out with or without the clutch disc 5. If the clutch disc 5 is already installed while the various devices monitor the distances covered by various movable parts and one or more forces which are being applied during assembly of the torque transmitting apparatus, it is often desirable or necessary to ensure that the bias of the resilient elements 5f between the two sets of friction linings 5c' shown in FIGS. 9 and 10 be taken into consideration during measurement of forces because the bias of the resilient elements 5f is superimposed upon the bias of the diaphragm spring 34.

Figure 5:
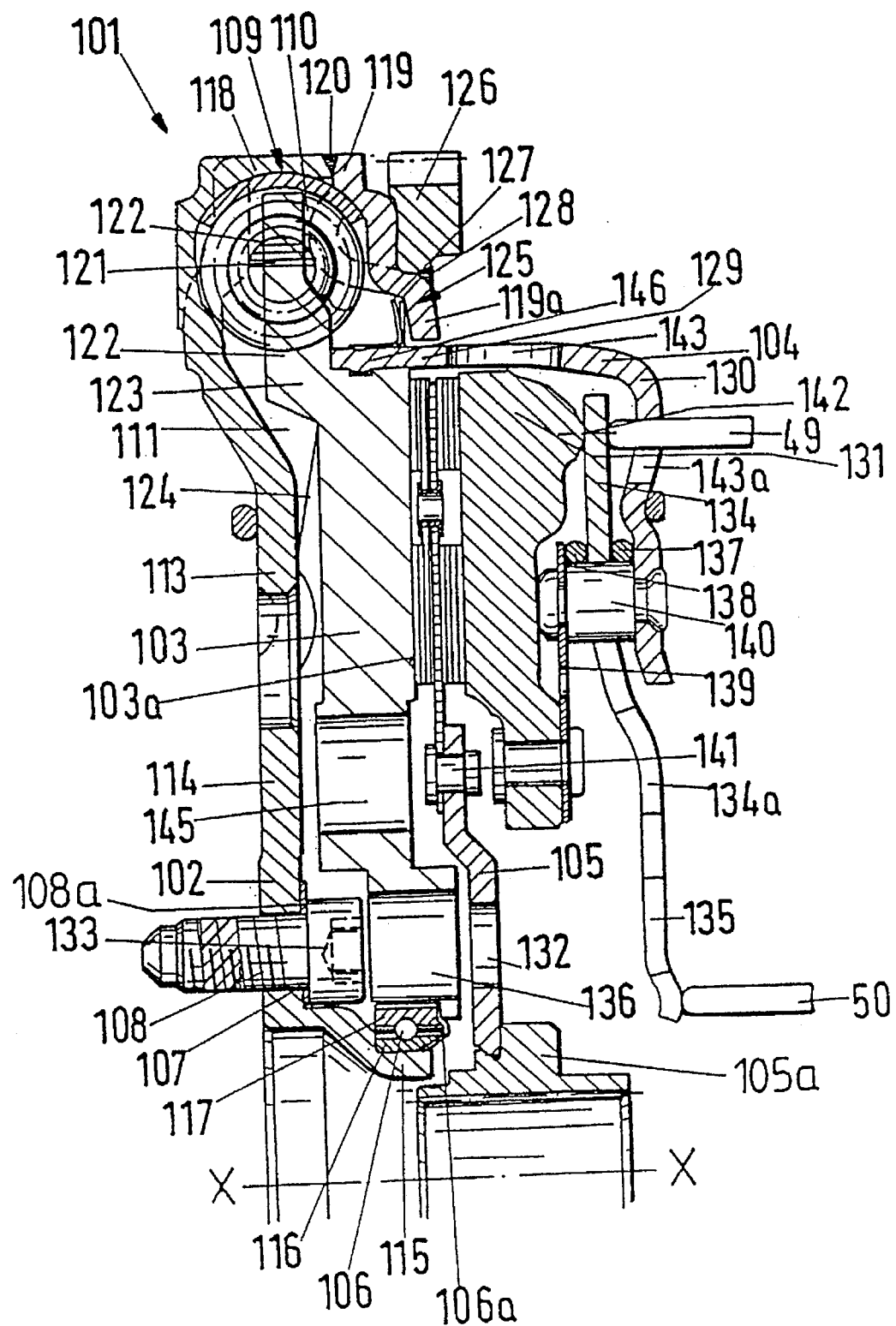
FIG. 5 is a fragmentary axial sectional view of a torque transmitting apparatus which constitutes a first modification of the torque transmitting apparatus of FIGS. 1 to 4.

In many instances, it is advantageous and desirable that the flywheel 3 be press fit in and centered by the housing 30 of the friction clutch 4. The provision of welded seams 46 also constitutes a presently preferred connection between the housing 30 and the flywheel 3 or a part (such as the stressing member 22) which is carried by the flywheel 3. Still further, it is often desirable to establish a form-locking connection between the housing and the friction clutch (such form-locking connection is shown in FIG. 5). Additionally form-locking connections are described and shown in the aforementioned published German patent application Serial No. 41 17 584.

Another presently preferred embodiment of the improved method includes the making of a complete module including the friction clutch 4 as well the composite flywheel 1 so that the complete module is ready to be affixed to the output element of an engine or another prime mover. Such an embodiment of the improved method comprises the step of assembling an incomplete module wherein the pressure plate 31 is movable relative to the housing 30 in the directions of the axis X—X but is prevented (such as by the leaf springs 39) from rotating relative to the housing, and wherein the incomplete module further comprises the diaphragm spring 34 or another clutch spring which reacts against the housing 30 and at least indirectly bears against the pressure plate 31, in the engaged condition of the clutch 4. The next step includes fixing the incomplete module to the flywheel 3 upon interposition of the clutch disc 5, and an additional step includes centering the preferably cylindrical portion 29 of the housing 30 on a complementary cylindrical portion of the flywheel 3. Still another step includes moving the housing 30 and the flywheel 3 toward each other in the direction of the axis X—X with attendant stressing of the diaphragm spring 34 beyond a predetermined operating point, and additional steps including measuring the bias of the stressed clutch spring 34, moving the housing 30 and the flywheel 3 away from each other in the direction of the axis X—X until the bias of the spring 34 decreases to the predetermined operating point, measuring the bias of the spring 34 during movement of the housing 30 and the flywheel 3 away from each other, and at least indirectly attaching (e.g., by the welded seams 46) the housing 30 to the flywheel 3 in predetermined axial and angular positions.

The step of assembling an incomplete module including the friction clutch 4 can further comprise the step of providing a device (e.g., a bearing which can act upon the tips 51 of the prongs 34a) which can disengage the friction clutch.

The operating point of the diaphragm spring 34 can be established by a set point or value. It is often desirable to select the operating point as a function of one or more characteristics of the diaphragm spring 34, i.e., the operating point can constitute an ideal value which is valid or acceptable only for the selected diaphragm spring and is one of a range of acceptable values (i.e., the ideal value can be selected within a given range of tolerances).

The just described embodiment of the improved method can include the step of establishing an operative position by averaging the measurements by the various force and distance measuring and other devices against the bias of the clutch spring and counter to the direction of bias of the diaphragm spring. This renders it possible to take into consideration, at least to a certain extent, the hysteresis and/or the influence of friction during determination of the optimum or ideal operating point for the diaphragm spring.

The centering of the housing 30 relative to the flywheel 3 preferably includes the establishment of a predetermined friction between the cylindrical portion 29 of the housing 30 and the cylindrical centering or centered portion of the flywheel 3. This can be achieved by resorting to close tolerances, by resorting to a lubricating step or in another suitable way. Alternatively, it is also possible to mount the flywheel 3 in the cylindrical portion 29 of the housing 30 with a certain amount of clearance and to thereupon center such parts relative to one another in any suitable manner. The connection between the cylindrical portion 29 and the flywheel 3 can be a welded joint (such as that including the sections 46), a form-locking connection employing rivets, bolts or the like, by complementary male and female detent elements and/or in any other suitable way.

FIG. 5 illustrates a further embodiment of a torque transmitting apparatus which is assembled in accordance with the method of the present invention. All such parts of the apparatus of FIG. 5 which are identical with or clearly analogous to corresponding parts of the apparatus of FIGS. 1, 2, 3 and 4 are denoted by similar reference characters plus 100.

The composite flywheel 101 of the apparatus of FIG. 5 comprises a primary flywheel 102 and a secondary flywheel 103 which carries the friction clutch 104. The composite flywheel 101 and the friction clutch 104 (including its clutch disc 105 are assembled into a complete module which is ready to be affixed to the output element of an engine, not shown, in a time-saving operation and by resorting to rudimentary tools which are capable of driving the shanks of the threaded fastener 108 into the tapped bores or holes of an output element.

The stressing member 122 and its arms 21 are offset relative to the major portion of the secondary flywheel 103 in a direction toward the main section 113 of the primary flywheel 102, i.e., toward the engine which is assumed to be located to the left of the main section 113. This enables the arms 121 to assume axial positions substantially in the plane of, and radially outwardly from, the radially extending portion 114 of the main section 113. In other words, the common plane of the axes of the energy storing elements 110 forming part of the damper 109 in the compartment 112 of the chamber 111 coincides with or is close to the plane of the radially extending portion 114. The substantially plane radially extending portion 114 of the main section 113 of the primary flywheel 102 is located radially inwardly of a radially outer portion 118 which bulges in a direction to the left, as viewed in FIG. 5, i.e., toward the engine whose output element is connected with the protuberance 115 of the main section 113. The portion 118 of the main section 113 has a substantially C-shaped cross-sectional outline and has an open side facing away from the engine, i.e., toward the wall 119 which is sealingly secured thereto by the welded joint 120. The radially outermost part of the portion 118 surrounds at least the radially outermost portions of convolutions forming part of the arcuate energy storing elements 110. The wall 119 extends substantially radially of the common axis of the flywheels 102, 103 and is adjacent to the right-hand portions of the energy storing elements 110, as viewed in FIG. 5. A portion of the wall 119 of the primary flywheel 102 defines a substantially cylindrical external shoulder for the starter gear 126. The latter is welded to the wall 119. The radially inner portion 119a of the wall 119 is adjacent the sealing element 125 for the chamber 111 and its compartment 112. The sealing element 125 is or can be identical with or similar to the sealing element 25 of the apparatus which is shown in FIG. 1.

The other sealing element 124 for the chamber 111 includes a resilient member which resembles or constitutes a .diaphragm spring having a radially inner portion which is centered by the root portion 123 of the stressing member 122 for the energy storing elements 110 of the damper 109, and a radially outer portion which bears against the adjacent part of the substantially radially extending portion of the main section 113 forming part of the primary flywheel 102. Thus, the diaphragm spring which constitutes or forms part of the sealing element 124 reacts against the root portions 123 (which are of one piece with the secondary flywheel 103) and bears axially against the primary flywheel 102.

The axially extending cylindrical guide portion 129 of the clutch housing or cover 130 surrounds a major portion of the secondary flywheel 103. The housing 130 can be provided with recesses corresponding to the recesses 47 of the cylindrical portion 29 of the housing 30 (refer again to FIG. 4) to accommodate portions of the stressing member 122. The secondary flywheel 103 is non-rotatably (form-lockingly) connected to the housing 130 in such a way that these components cannot turn relative to each other. This is accomplished by deforming (caulking) such parts, as at 146. However, it is equally possible to establish a form-locking connection between the secondary flywheel 103 and the cylindrical guide portion 129 of the housing 130 in any other suitable way, e.g., by welding and/or riveting.

The module of FIG. 5 comprises the aforementioned threaded fasteners 108 which are installed in the bores or holes 107 of the radially inner portion 114 of the main section 113 of the primary flywheel 102 in such a way that they cannot become lost during shipment or in storage. As shown, the diameters of the heads 133 of the fasteners 108 are larger than those of the registering windows or openings 136 in the radially inner portion of the secondary flywheel 103. FIG. 5 further shows elastically deformable inserts 108a which surround the shanks of the fasteners 108 and extend into the bores or holes 107 of the primary flywheel 102 to yieldably hold the fasteners 108 in optimum positions for engagement of their heads 133 by the working end of a torque transmitting tool which is used to drive the shanks of the fasteners into the registering tapped bores or holes of the output element of an engine or another prime mover. Such mounting of the fasteners 108 in the module of FIG. 5 simplifies the task of a person or an automaton in an automobile assembling plant or in any other plant in which the module is to be put to use. It is to be noted that FIG. 5 shows one of the fasteners 108 in an axial position in which the shank extends into the tapped bore or hole of an output element and the head 133 bears against the right-hand side of the adjacent portion 114 of the primary flywheel 102 to fix the latter in a desired axial and angular position relative to the output element.

The hub 105a of the clutch disc 105 in the module of FIG. 5 is coaxial with and partially overlaps the radially innermost portion or protuberance 115 of the main section 113 of the primary flywheel, 102. The main section 113 is preferably made of a metallic sheet material, the same as the wall 119 of the primary flywheel 102. As can be seen in FIG. 5, a portion of the hub 105a extends toward the engine (which is assumed to be located to the left of the primary flywheel 102 when the latter is affixed to the output element of the engine) and into the hollow proturbance 115 of the main section 113 to thus contribute to compactness of the entire module, particularly as seen in the direction of the axis X—X. This is highly desirable in many presently produced motor vehicles.

The assembly of the torque transmitting apparatus can be simplified and optimized by providing at least one abutment (such as at 146) for the flywheel 103. The abutment or abutments can be provided on the housing 130 to extend in the axial direction of the pressure plate 131 in order to fix the axial position of the flywheel 103 (i.e., of the counterpressure plate of the friction clutch 104) upon completion of the measuring steps. The abutment or abutments extend radially inwardly toward the axis X—X.

Figure 6:
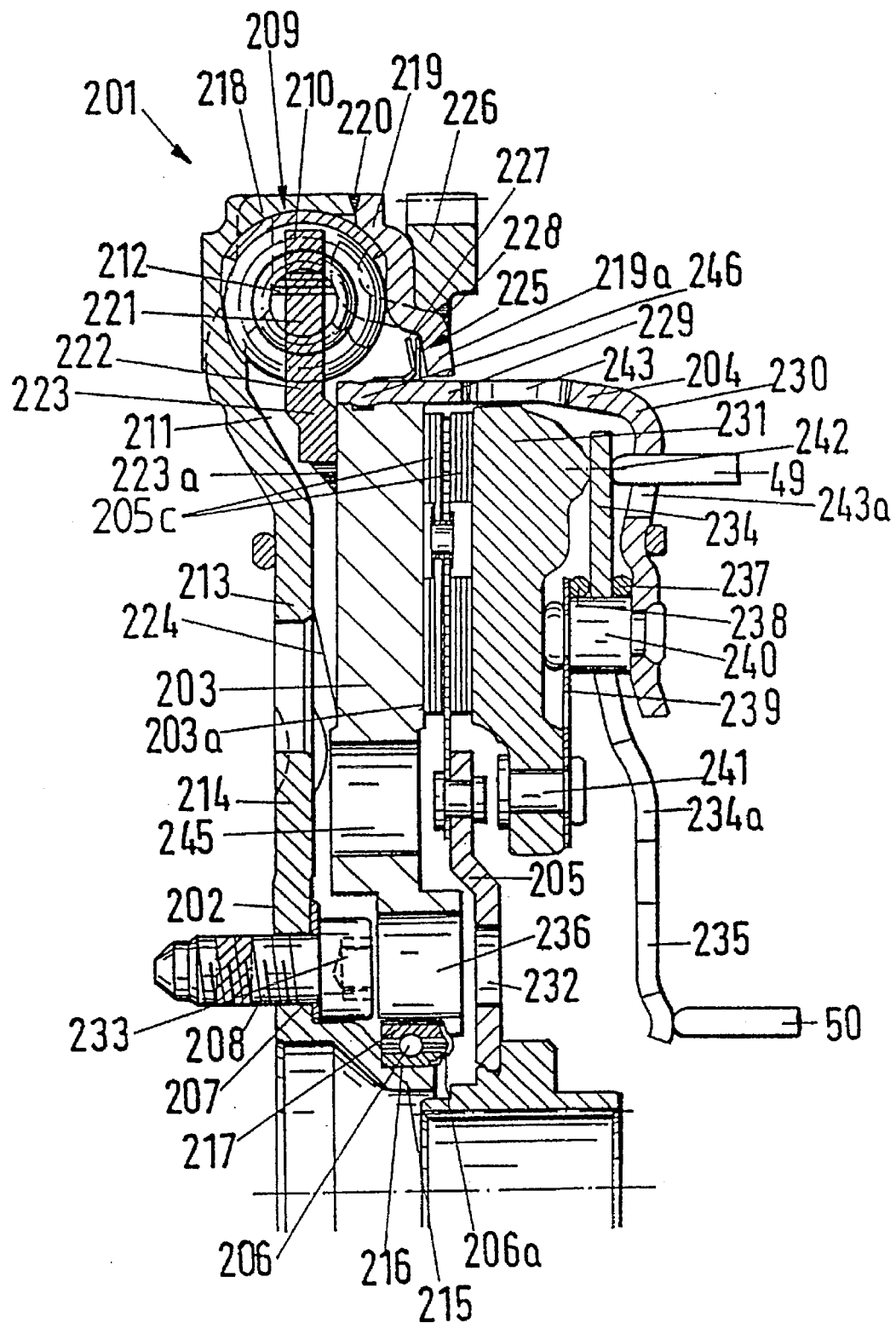
FIG. 6 is a fragmentary axial sectional view of a torque transmitting apparatus constituting a second modification of the apparatus of FIGS. 1 to 4.

Referring to FIG. 6, there is shown still another assembled module which is ready to be affixed to the output element of an engine or another prime mover. Again, the single threaded fastener 108 which can be seen in FIG. 6 is illustrated in the position it assumes when its shank extends into a tapped bore or hole of the output element, i.e., when the module of FIG. 6 is properly affixed to the engine. All such parts of the module of FIG. 6 which are identical with or clearly analogous to the corresponding parts of the module of FIG. 5 are denoted by similar reference characters plus 200.

The composite flywheel 201 is similar to the composite flywheel 101 of the module which is shown in FIG. 5. One of the more pronounced differences between the modules of FIGS. 5 and 6 is that the stressing member 222 (with its arms 221) is a separately produced part which is welded (as at 223a) to the secondary flywheel 203. In lieu of the welded seam 223a (or in addition to such seam), the form-locking connection between the secondary flywheel 203 and the stressing member 222 can comprise bolts, screws, rivets or the like without departing from the method of the present invention.

The sealing element 224 includes or constitutes a diaphragm spring which is centered by an annular shoulder provided in the left-hand side of the secondary flywheel 203 opposite the friction surface 203a and slightly radially inwardly of the friction linings 205c forming part of the clutch disc 205. The radially outer portion of the sealing element 224 bears against the radially extending portion 214 of the main section 213 of the primary flywheel 202. The main section 213 preferably constitutes a converted blank of metallic sheet material, the same as the wall 219.

The secondary flywheel 203 can constitute a stamping which is desirable because such procedure involves the utilization of relatively small qualities of metallic sheet material. The module of FIG. 6 constitutes a simplification of the aforedescribed modules because the secondary flywheel 203 need not be subjected to any special treatment in order to form the stressing member 222 and its arms 221; as mentioned above, the stressing member 222 is a separately produced part (e.g., a stamping) which is bonded (at 223a) or is otherwise form lockingly secured to the secondary flywheel. Another advantage of the module of FIG. 6 is that the secondary flywheel 203 and the stressing member 222 can be made of different materials. For example, the material of the stressing member 222 and of its arms 221 can be more resistant to wear than the material of the secondary flywheel 202 so that it is not necessary to harden the arms 221, a procedure which is desirable if the arms (such as 121 ) are of one piece with the secondary flywheel (such as 103) and the material of the secondary flywheel is not overly resistant to wear.

Figure 7:
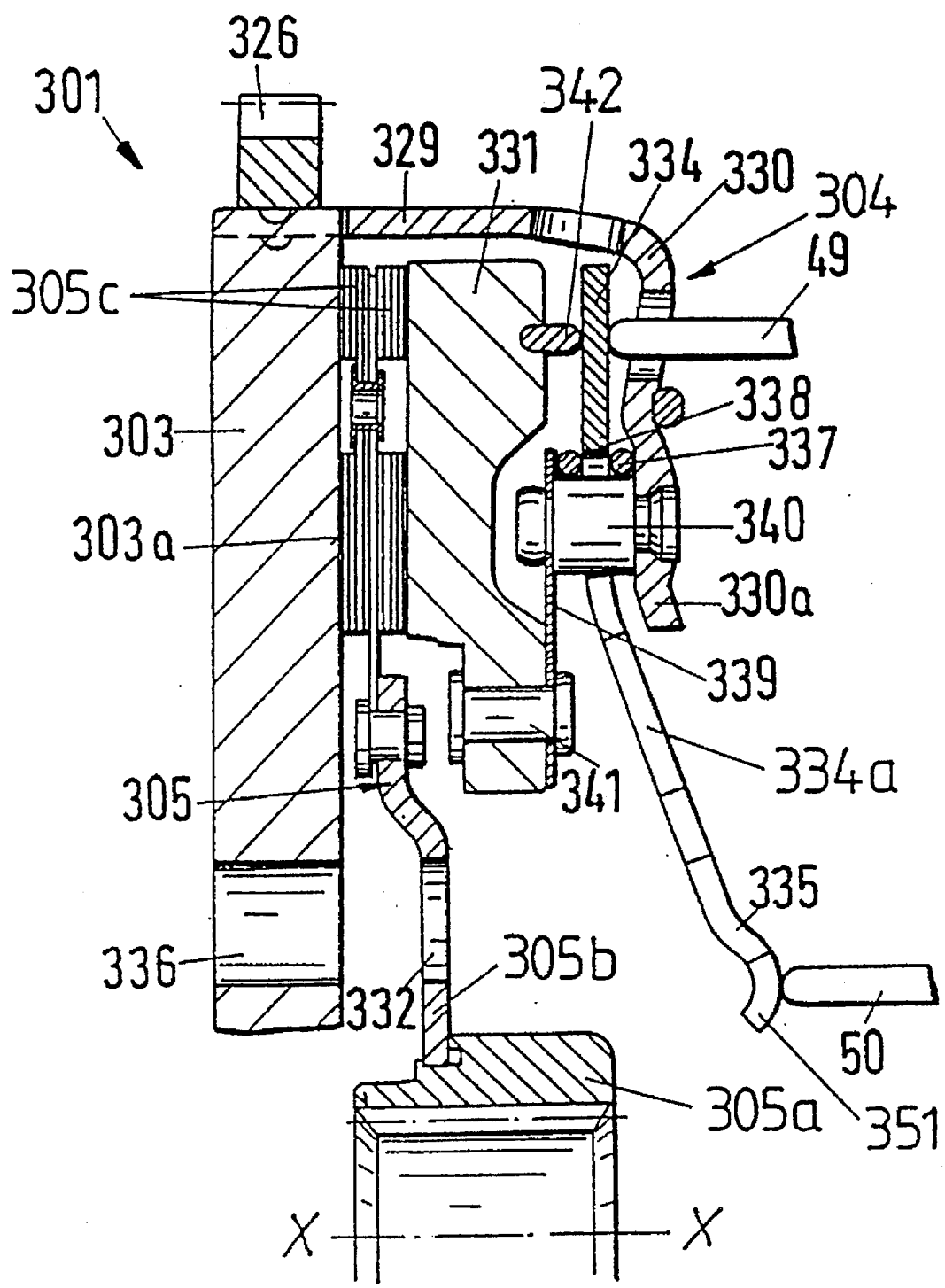
FIG. 7 is a fragmentary axial sectional view of a torque transmitting apparatus constituting a third modification of the apparatus which is shown in FIGS. 1 to 4.

Referring to FIG. 7, there is shown a portion of a module 301 which constitutes a simple torque transmitting apparatus in that it comprises a single flywheel 303 which can be affixed to the output element of an engine or another prime mover in the same way as described in connection with the modules of FIGS. 1, 5 and 6. The flywheel 303 constitutes a counterpressure plate for the axially movable pressure plate 331 of the friction clutch 304 which further includes a clutch spring 334 in the form of a diaphragm spring, leaf springs 339 which axially movably secure the pressure plate 331 to the housing or cover 330 of the clutch 304, and a starter gear 326 which surrounds the flywheel 303 and is non-rotatably affixed to the latter in such a way that the parts 326 and 303 share all angular movement about the axis X—X.

An advantage of the module which constitutes the torque transmitting apparatus of FIG. 7 is that it can be balanced or trued in fully assembled condition prior to shipment into storage or to an automobile assembling plant where the apparatus 301 is ready to be affixed to an output element by fasteners having shanks extending into and through the openings or windows 336 of the single flywheel 303. The apparatus 301 is accurately centered relative to the engine in response to proper attachment to the output element of the engine; to this end, the output element can be provided with a centering portion which engages a complementary shoulder or another suitable configuration on the flywheel 303. Alteratively, the output element (e.g., a crankshaft) of the engine can be provided with an integral or separately produced carrier of sheet metal or the like which can support the flywheel 303.

A portion of the right-hand side of the flywheel 303 (as viewed in FIG. 7) constitutes a friction surface 303a which can frictionally engage the adjacent friction linings 305c of the clutch disc 305.

The starter gear 326 can be welded or otherwise reliably affixed to the radially outermost portion of the flywheel 303, and the latter can further carry a second gear (not specifically shown) which constitutes a signal generator and transmits input signals to an engine management system not forming part of the present invention. Alternatively, the illustrated starter gear 326 can perform the additional function of a signal generator or the second gear can be replaced with a simpler signal generator which transmits one or more signals to an engine management system in one or more predetermined angular positions of the flywheel 303.

The axially extending portion 329 of the clutch cover or housing 330 is fixedly secured to the flywheel 303, i.e., to the counterpressure plate of the friction clutch 304. The connection between the portion 329 of the housing 330 and the flywheel 303 can be similar to that between the portion 229 and the flywheel 203 .or that between the portion 129 and the flywheel 103 or that between the portion 29 and the flywheel 3. Such connection is compact as seen in the radial direction of the apparatus 301, while permitting the utilization of large-diameter friction linings 305c. Compactness is a feature which is desirable when the apparatus which has been assembled in accordance with the method of the present invention is to be used under the hood of a motor vehicle.

The housing 330 of the friction clutch 304 further comprises a radially inwardly extending portion 330a which carries a set of rivets 340 (only one shown in FIG. 7) serving to tiltably secure the diaphragm spring 334 and the two ring-shaped seats 337, 338 for the circumferentially complete radially outer portion of the diaphragm spring. Each of the illustrated seats 337, 338 is a circumferentially complete annulus of wire having a circular cross-sectional outline. However, it is equally possible to employ other types of seats; for example, the seat 337 can form an integral part of the radially inwardly extending portion 330a of the housing 330, or the seat 337 and/or 338 can be omitted or made of one piece with the rivets 340 or with the diaphragm spring 334. The rivets 340 further serve to connect the respective end portions of the leaf springs 339 to the housing 330 in such a way that the leaf springs tend to move the pressure plate 331 axially and away from the counterpressure plate or flywheel 303 when the friction clutch 304 is disengaged, i.e., when the diaphragm spring 334 permits the pressure plate 331 to move toward the portion 330a of the clutch housing 330. The rivets 341 (only one shown in FIG. 7) connect the leaf springs 339 to radially inwardly extending projections of the pressure plate 331 so that the pressure plate 331 cannot turn relative to but can move axially toward and away from the radially extending portion 330a of the housing 330. Thus, the flywheel 303 receives torque from the engine and transmits torque to the cylindrical portion 329 of the housing 330, and the radially extending portion 330a of the housing transmits torque to the diaphragm spring 334 and leaf springs 339 which, in turn, transmit torque to the pressure plate 331. The latter transmits torque to the clutch disc 305 when the friction clutch 304 is engaged, i.e., when the friction lining 305c are clamped between the friction surface 303a of the flywheel 303 and the adjacent side or surface of the pressure plate 331. The pressure plate 331 is then biased by the spring 334 with a force which suffices to prevent the pressure plate 331 and the counterpressure plate or flywheel 303 from slipping relative to the friction linings 305a.

The friction clutch 304 which is shown in FIG. 7 is a push-type clutch, i.e., the free ends or tips of the prongs 334a forming part of the diaphragm spring 334 must be depressed in a direction toward the pressure plate 331 in order to ensure that the radially outer portion of the diaphragm spring relaxes the bias upon the insert 342 which is embedded in and can be fixedly secured to the pressure plate. However, the invention can be embodied with equal or similar advantage in a method of assembling a torque transmitting apparatus which is similar to the apparatus 301 except that it employs a pull-type friction clutch. The radially outermost part of the circumferentially complete portion of the diaphragm spring 334 in a pull-type friction clutch is tiltably mounted in the housing 330, and a radially inner part of the circumferentially complete portion can be pivoted toward and into engagement with the insert 342 in order to engage the pull-type clutch. The tips 335 of the prongs 334a are then pulled in a direction away from the pressure plate 331 in order to disengage the pull-type friction clutch.

The illustrated clutch disc 305 comprises a carrier 305b which supports the two sets of friction linings 305c. This clutch disc 305 can be replaced by a more complex clutch disc, e.g., one having resilient means interposed between the carrier 305b and the friction linings 305c or one having one or more dampers interposed between a first portion of the carrier which supports the friction linings (with or without resilient means between the first portion and the friction linings) and a second portion which is mounted on or is integral with the hub 305a. Reference may be had again to FIG. 9 which shows the more sophisticated clutch disc 5'. The clutch disc 5' of FIG. 8 is similar to those described in the aforementioned published German patent application Serial No. P 42 06 880 to which reference may be had, if necessary.

The hub 305a has axially parallel internal flutes which alternate with axially parallel ribs serving to ensure that the clutch disc 305 can transmit torque to a shaft having a complementary external surface and extending into the hub 305a. The shaft can constitute the input element of a variable-speed transmission or an intermediate shaft in a power train between the friction clutch 304 and one or more wheels of a motor vehicle. The aforementioned flutes and ribs in the hub 305a and on the aforementioned shaft can be replaced by other suitable means which ensure that the shaft is compelled to share all angular movements of the clutch disc 5', 305 or an analogous clutch disc.

The clutch disc 305 of FIG. 7 has several openings or windows 332 which are provided in the carrier 305b adjacent the hub 305a, and each opening 332 registers, at least in part, with an opening or window 336 in the radially inner portion of the flywheel 303 when the apparatus 301 is ready to be secured to the output element of an engine. This enables the working end of the aforementioned torque transmitting tool to pass (first through an opening or window 335 in or between the adjacent prongs 334a of the diaphragm spring 334 and thereupon) through an opening 332 on its way into a polygonal socket in the head of a threaded fastener corresponding to the fastener 208 in FIG. 6. Though FIG. 7 does not show any threaded fasteners, such fasteners are or can be furnished with the apparatus 301 in the same way as shown for the fasteners 208 and the primary flywheel 202 of FIG. 6 in order to simplify the task of a person or an automaton in an automobile assembling plant where the apparatus 301 of FIG. 7 is to be centered on and reliably secured to the output element of an engine.

The radially inner portion of the flywheel 303 can carry a suitable pilot bearing for the adjacent end portion of the input shaft of a variable-speed transmission or for the adjacent end portion of an intermediate shaft in the power train between the friction clutch 304 and one or more wheels of a motor vehicle. The pilot bearing can be installed in a complementary recess provided therefor in a radially innermost portion of the flywheel 303.

It is further possible to assemble the flywheel 303 and/or the housing 330 and/or one or more additional components of the apparatus 301 of two or more separately produced and separably connected parts. This simplifies the task of a person who wishes to gain access to certain parts in the housing 330 if such parts necessitate inspection, reprocessing, lubrication or other treatment, replacement or repair. It is presently preferred to provide a separable connection between the axially extending cylindrical portion 329 and the radially extending portion 330a of the clutch housing 330.

FIG. 7 further shows distance, measuring devices 49 and 50 which (together with a force measuring device 49A and a computer 61, not shown in FIG. 7) can be used in order to assemble the apparatus 301 in accordance with the method of the present invention. The illustrated distance measuring devices 49 and 50 are positioned (with reference to the diaphragm spring 334) in the same way as shown in FIG. 1 for the distance measuring devices 49, 50 and the diaphragm spring 34.

The improved method can be modified in a number of different ways. For example, certain steps which are necessary to assemble the torque transmitting apparatus of FIG. 1 or FIG. 8 but are not necessary for the assembly of the apparatus of FIG. 5 can be utilized to assemble the apparatus of FIG. 6 and/or FIG. 7, certain steps which are necessary to assemble the apparatus of FIG. 5 but are not needed to assemble the apparatus of FIG. 1 or 8 can be used in connection with the assembly of apparatus of the type shown in FIG. 6 and/or 7, and so forth. Thus, certain steps of the method of assembling any one of the aforedescribed apparatus can be omitted or resorted to in assembling similar or analogous apparatus without departing from the spirit of the present invention. Furthermore, many other types of torque transmitting apparatus for use in motor vehicles or elsewhere can be assembled by resorting to one of the aforedescribed embodiments of the improved method or to other embodiments which are equivalent to those described hereinbefore. Still further, certain combinations of two or more steps of the improved method are deemed to merit patent protection per se.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A method of mounting a friction clutch which, in a fully assembled condition thereof, includes a complete module that comprises a flywheel and is connectable to a rotary crankshaft, comprising the steps of assembling an incomplete module including a clutch housing rotatable about a predetermined axis, a pressure plate rotatable with and movable relative to the housing in the direction of said axis, and a clutch spring reacting against the housing and bearing against the pressure plate in an engaged condition of the clutch; fixing the incomplete module to the flywheel, including inserting a clutch disc between the pressure plate and the flywheel; centering a cylindrical portion of the housing relative to a cylindrical guide of the flywheel; moving at least one of the housing and the flywheel toward the other of the housing and the flywheel in the direction of said axis with attendant stressing of the clutch spring beyond a predetermined operating point; measuring the bias of the clutch spring; moving at least one of the housing and the flywheel away from the other of the housing and the flywheel in the direction of said axis until the bias of the clutch spring reaches to said operating point; measuring the bias of the clutch spring during movement of at least one of the housing and the flywheel away from the other of the housing and the flywheel; and at least indirectly attaching the housing to the flywheel in a predetermined axial and angular directions.

2. The method of claim 1, wherein the step of assembling an incomplete module further comprises providing a device for disengaging the clutch.

3. The method of claim 1, wherein the operating point is established by a set value.

4. The method of claim 1, wherein the operating point is a function of the characteristics of the clutch spring.

5. The method of claim 1, wherein an operative position is established by averaging the measurements against the bias of the clutch spring and counter to such direction.

6. The method of claim 1, further comprising the step of establishing a predetermined friction between the cylindrical portion of the housing and the cylindrical guide of the flywheel.

7. The method of claim 1, further comprising the step of holding the housing against movement at least in the direction of said axis in the course of at least one of said fixing and moving steps.

8. The method of claim 1, further comprising the step of terminating the bias upon at least one of the incomplete module and the pressure plate subsequent to said measuring steps.

9. The method of claim 1, further comprising the step of ascertaining said predetermined operating point with a computer.

10. The method of claim 1, wherein the clutch spring is a diaphragm spring having a characteristic curve and at least one of said measuring steps includes measuring the stressing of the diaphragm spring against the spring bias beyond a minimum of said characteristic curve.

11. The method of claim 1, wherein the clutch spring is a diaphragm spring having a marginal portion movable into contact with the housing and at least one of said measuring steps comprises measuring the stressing of the diaphragm spring against the bias of the diaphragm spring until the marginal portion of the diaphragm spring comes into contact with the housing.

12. The method of claim 1, wherein the friction clutch is subject to a required minimum wear and further comprising the step of ascertaining said predetermined operating point as a function of at least one variable parameter including said minimum wear.

13. The method of claim 1, wherein the friction clutch comprises a plurality of components, and further comprising the steps of classifying at least some of said components into a plurality of tolerance classes and assembling said components for the purpose of obtaining a substantially constant operating point.

14. The method of claim 1, wherein the clutch disc has friction linings and resilient means between the friction linings.

15. The method of claim 1, wherein the flywheel is a secondary flywheel of a composite flywheel further having a primary flywheel.

16. The method of claim 1, wherein said centering step comprises establishing a press fit between the flywheel and the housing.

17. The method of claim 1, wherein said fixing step comprises at least indirectly bonding the flywheel and the incomplete module to each other.

18. The method of claim 1, wherein said fixing step comprises establishing a form locking connection between the flywheel and the incomplete module.

19. A method of mounting a friction clutch which, in a fully assembled condition thereof, includes a complete module that comprises a flywheel and is connectable to a rotary crankshaft, comprising the steps of assembling an incomplete module including a clutch housing rotatable about a predetermined axis, a pressure plate rotatable with and movable relative to the housing in the direction of said axis, and a clutch spring reacting against the housing and bearing against the pressure plate in an engaged condition of the clutch; and fixing the incomplete module to the flywheel, including inserting a clutch disc between the pressure plate and the flywheel, centering a cylindrical portion of the housing relative to a cylindrical guide of the flywheel, moving at least one of the housing and the flywheel toward the other of the housing and the flywheel in the direction of said axis with attendant stressing of the clutch spring, measuring the bias of the clutch spring, ascertaining and memorizing first axial positions of the housing and the flywheel relative to each other when the bias of the clutch spring reaches a first value, moving at least one of the housing and the flywheel toward the other of the housing and the flywheel, moving at least one of the housing and the flywheel axially and away from the other of the housing and the flywheel, measuring the bias of the clutch spring during movement of at least one of the housing and the flywheel away from the other of the housing and the flywheel, ascertaining and memorizing second axial positions of the housing and the flywheel relative to each other when the bias of the clutch spring reaches a second value, moving at least one of the housing and the flywheel axially relative to the other of the housing and the flywheel to a third position at least substantially midway between said first and second positions, and fixedly securing the housing and the flywheel to each other in said third position.

* * * * *